(12) United States Patent
Wake et al.

(10) Patent No.: US 8,361,665 B2
(45) Date of Patent: Jan. 29, 2013

(54) FUEL CELL SYSTEM

(75) Inventors: Chihiro Wake, Shioya-gun (JP);
Koichiro Miyata, Utsunomiya (JP);
Jumpei Ogawa, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 425 days.

(21) Appl. No.: 12/009,971

(22) Filed: Jan. 22, 2008

(65) Prior Publication Data

US 2008/0176122 A1 Jul. 24, 2008

(30) Foreign Application Priority Data

Jan. 24, 2007 (JP) ................................. 2007-013621

(51) Int. Cl.
*H01M 8/04* (2006.01)

(52) U.S. Cl. ........ 429/429; 429/428; 429/430; 429/433; 429/437

(58) Field of Classification Search ...................... 429/24
See application file for complete search history.

(56) References Cited

U.S. PATENT DOCUMENTS

| 6,365,289 | B1 * | 4/2002 | Lee et al. ....................... 429/429 |
| 2002/0127448 | A1 * | 9/2002 | Derflinger et al. .............. 429/24 |
| 2002/0164510 | A1 | 11/2002 | Brueck et al. |
| 2003/0003334 | A1 * | 1/2003 | Yoshizawa et al. ............. 429/22 |
| 2006/0159969 | A1 * | 7/2006 | Matsubayashi ................ 429/22 |
| 2006/0234092 | A1 * | 10/2006 | Thompson et al. ............ 429/13 |
| 2007/0224471 | A1 * | 9/2007 | Tanaka et al. .................. 429/22 |

FOREIGN PATENT DOCUMENTS

| JP | 7-320760 | 12/1995 |
| JP | 2003-504808 | 2/2003 |
| JP | 2003-178767 | 6/2003 |
| JP | 2005-44629 | 2/2005 |
| JP | 2005-332652 | 12/2005 |
| JP | 2006-134669 | 5/2006 |
| WO | WO 2006013949 A1 * | 2/2006 |

OTHER PUBLICATIONS

Japanese Office Action for Application No. 2007-013621, 6 pages, dated Apr. 24, 2012.

* cited by examiner

*Primary Examiner* — Emily Le
*Assistant Examiner* — Michael Forrest
(74) *Attorney, Agent, or Firm* — Nelson Mullins Riley & Scarborough LLP; Anthony A. Laurentano

(57) ABSTRACT

A fuel cell system including: a fuel cell which generates electrical power through the reaction of a reaction gas; a reaction gas supply device which supplies the reaction gas to the fuel cell; a cooling device which cools the fuel cell by circulating a coolant through the fuel cell; a fuel cell operating temperature output device which outputs a maximum temperature inside the fuel cell as an operating temperature of the fuel cell; and a fuel cell temperature adjustment device which adjusts a temperature inside the fuel cell so that the operating temperature inside the fuel cell is less than a preset upper temperature limit.

4 Claims, 25 Drawing Sheets

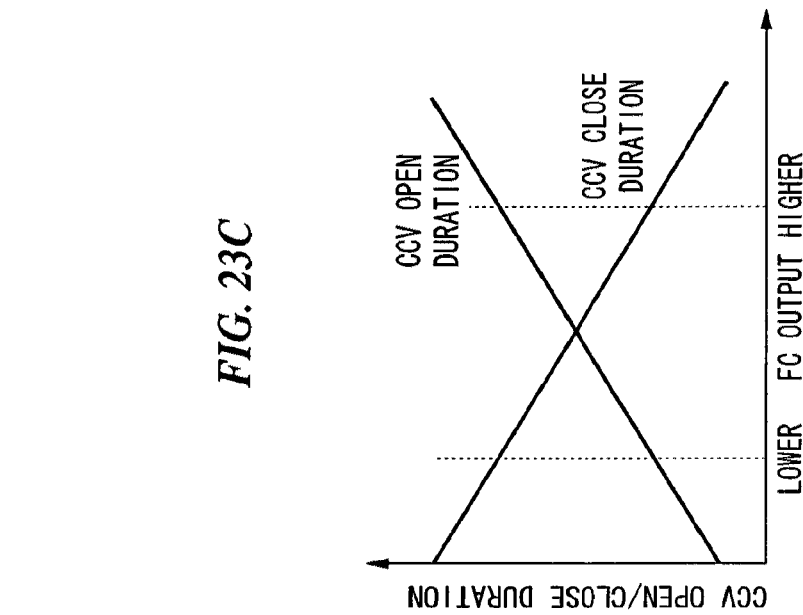
FIG. 23C
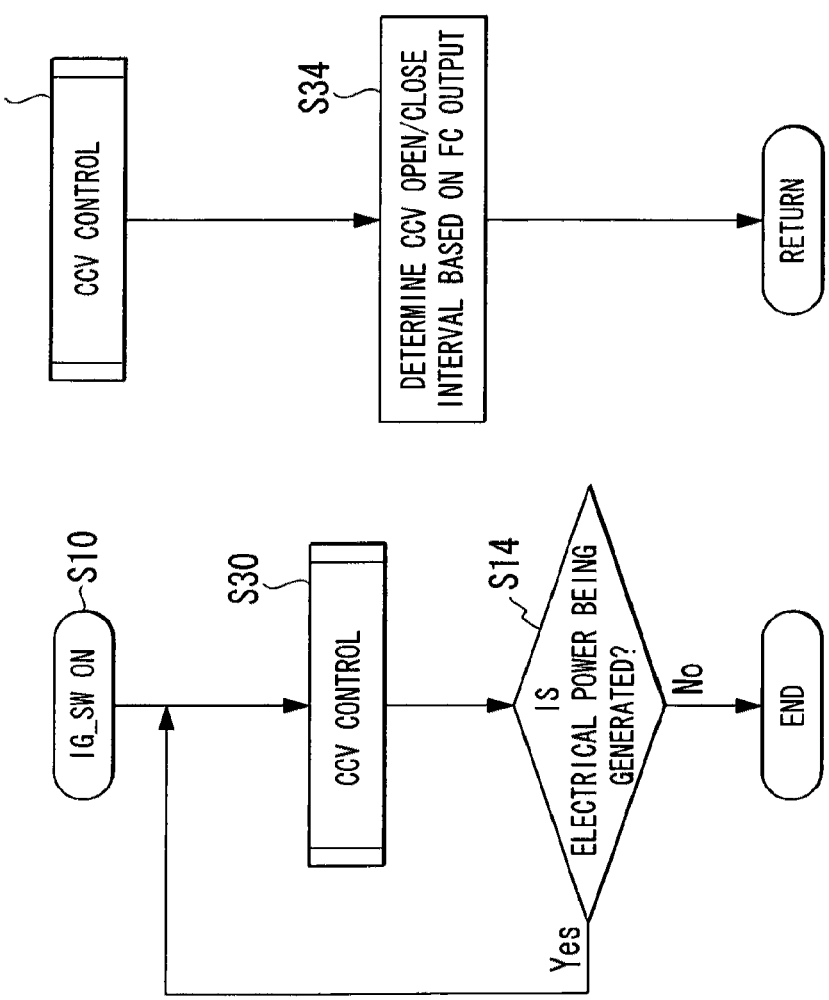
FIG. 23B
FIG. 23A

FUEL CELL SYSTEM

BACKGROUND OF THE INVENTION

Priority is claimed on Japanese Patent Application No. 2007-013621, filed on Jan. 24, 2007, the content of which is incorporated herein by reference.

FIELD OF THE INVENTION

The present invention relates to a fuel cell system.

DESCRIPTION OF RELATED ART

Conventionally known examples of fuel cells include a design in which a membrane electrode assembly is formed by disposing an anode and a cathode to either side of a solid polymer electrolyte membrane, disposing a pair of separators on either side of this membrane electrode assembly to form a flat unit fuel cell (referred to as a "unit cell" hereinafter), and then stacking a plurality of these unit cells together to form a fuel cell stack. In this fuel cell, hydrogen gas is supplied between the anode and the separator as a fuel gas, while air is supplied between the cathode and the separator as an oxidizing gas. As a result, hydrogen ions generated by a catalytic reaction at the anode pass through the solid polymer electrolyte membrane and move toward the cathode. There, they react with the oxygen in the air, giving rise to an electrochemical reaction and the generation of electrical power.

The exothermic heat accompanies the generation of electrical power in the fuel cell. Since the membrane electrode assembly of the fuel cell experiences deterioration when it is heated in excess of its acceptable upper temperature limit, a coolant is supplied between adjacent unit cells to cool the fuel cell. For example, Japanese Unexamined Patent Application, First Publication No. 2006-134669 discloses a fuel cell system that is provided with a cooling unit for cooling the fuel cell by circulating a radiator fluid through the fuel cell. This fuel cell system is designed to alternately operate and stop the cooling unit in response to the operating temperature of the fuel cell. In this technology, the temperature of the drained radiator fluid is presumed to correspond to the operating temperature of the fuel cell.

FIG. 25B is a graph showing the relationship between the coolant temperature, the FC maximum internal temperature, and the acceptable upper temperature limit. When there is not adequate coolant in the fuel cell during warming-up operation, etc., temperature variation within the fuel cell occurs. For this reason, the maximum temperature inside the fuel cell may exceed that of the coolant. In this case, even if the temperature of the coolant is below the acceptable upper temperature limit, it is possible that the maximum temperature inside the fuel cell may exceed this acceptable upper temperature limit.

The present invention therefore has an object of providing a fuel cell system in which the maximum temperature inside the fuel cell is maintained below a preset upper temperature limit, so that deterioration of the fuel cell can be avoided.

SUMMARY OF THE INVENTION

In order to achieve the above-described object, the present invention employs the followings.
Namely, the fuel cell system of the present invention is a fuel cell system including: a fuel cell which generates electrical power through the reaction of a reaction gas; a reaction gas supply device which supplies the reaction gas to the fuel cell; a cooling device which cools the fuel cell by circulating a coolant through the fuel cell; a fuel cell operating temperature output device which outputs a maximum temperature inside the fuel cell as an operating temperature of the fuel cell; and a fuel cell temperature adjustment device which adjusts a temperature inside the fuel cell so that the operating temperature inside the fuel cell is less than a preset upper temperature limit.

According to the above-described fuel cell system, even if the maximum temperature inside the fuel cell is higher than the coolant temperature, it is possible to maintain the maximum temperature inside the fuel cell below the preset upper temperature limit. As a result, it is possible to avoid deterioration in the fuel cell.

It may be arranged such that the cooling device is provided with a coolant supply device which supplies the coolant in conjunction with an operation of the reaction gas supply device; and the fuel cell temperature adjustment device is provided with a coolant flow rate adjustment device which adjusts a flow rate of the coolant independently of the coolant supply device.

In this case, the coolant supply device is driven in conjunction with the reaction gas supply device, so that the structure of the fuel cell system can be simplified. In addition, even when the reaction gas supply device is driven in response to the output of the fuel cell and the coolant supply device is driven in conjunction with the reaction gas supply device, the temperature inside the fuel cell can be adjusted by freely adjusting the flow rate of the coolant since the fuel cell temperature adjustment device is provided with a coolant flow rate adjustment device which is capable of adjusting the coolant flow rate independently of the coolant supply device.

It may be arranged such that the fuel cell temperature adjustment device is provided with a fuel cell output limiter which limits an output of the fuel cell.

In this case, the temperature of the fuel cell can be appropriately adjusted.

It may be arranged such that the cooling device is provided with the coolant supply device which supplies the coolant in conjunction with the operation of the reaction gas supply device; and the fuel cell temperature adjustment device is provided with the coolant flow rate adjustment device which adjusts the flow rate of the coolant independently of the coolant supply device, and the fuel cell output limiter which limits the output of the fuel cell.

In this case, various adjustments of the fuel cell temperature can be performed. As a result, the maximum temperature inside the fuel cell can be maintained below the upper temperature limit with certainty, and a deterioration in the fuel cell can be avoided.

It may be arranged such that the fuel cell operating temperature output device is provided with a fuel cell operating temperature estimator which estimates the maximum temperature inside the fuel cell as the operating temperature, based on the output of the fuel cell and a coolant flow rate during warming-up operation.

In this case, it is possible to estimate the maximum temperature inside the fuel cell at low cost without adding a new piece of device for measuring the maximum temperature inside the fuel cell.

It may be arranged such that the fuel cell operating temperature output device is provided with the fuel cell operating temperature estimator which estimates the maximum temperature inside the fuel cell as the operating temperature, based on the output of the fuel cell, the coolant flow rate during warming-up operation, a temperature of the reaction gas, and a temperature of the coolant.

In this case, the maximum temperature inside the fuel cell is estimated based on multiple parameters, so that the fuel cell maximum internal temperature can be estimated with good accuracy.

It may be arranged such that the coolant flow rate adjustment device is a coolant control valve.

In this case, the supply flow rate of the coolant can be freely adjusted independently of the coolant supply device.

It may be arranged such that the coolant control valve is controlled based on the maximum temperature inside the fuel cell.

In this case, it is possible to control the supply flow rate of the coolant in response to the maximum temperature inside the fuel cell, so that warming-up operation can be carried out with good efficiency, and the maximum temperature inside the fuel cell can be maintained below the acceptable upper temperature limit. As a result, deterioration in the membrane electrode assembly of the fuel cell can be prevented.

It may be arranged such that the coolant flow rate adjustment device is a three-way valve.

In this case, it is possible to freely adjust the flow rate of coolant independently of the coolant supply device.

It may be arranged such that the three-way valve is controlled based on the maximum temperature inside the fuel cell.

In this case, it is possible to control the supply flow rate of the coolant in response to the maximum temperature inside the fuel cell, so that the warming-up operation can be carried out with good efficiency, and the maximum temperature inside the fuel cell can be maintained below the acceptable upper temperature limit. As a result, deterioration in the membrane electrode assembly of the fuel cell can be prevented.

BRIEF DESCRIPTION OF THE DRAWINGS

FIG. 23A is a flow chart for the cooling method of the fuel cell according to a fifth embodiment of the present invention. FIG. 23B is a flow chart of the subroutine for CCV control. FIG. 23C is a map for determining the opening/closing interval for the CCV.

DETAILED DESCRIPTION OF THE INVENTION

Preferred embodiments of the present invention will now be explained with reference to the drawings.

The schematic block diagram of the fuel cell system will be explained first. The fuel cell system is provided with a fuel cell stack in which multiple unit fuel cells (referred to as a "unit cell" hereinafter) are stacked together and electrically connected in series, and end plates are disposed to either side thereof and fastened with a tie rod.

(Fuel Cell)

Figure 1:
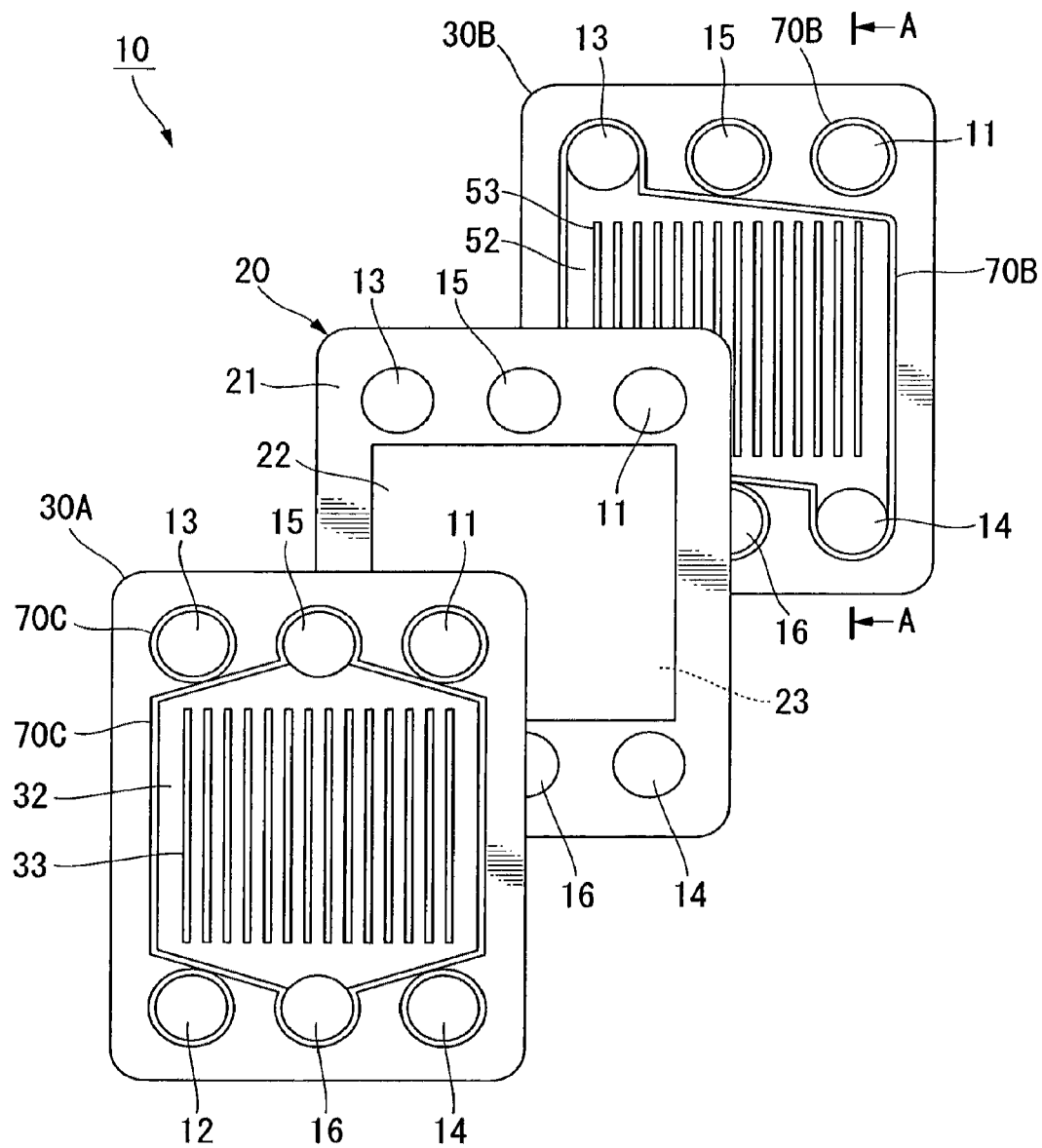
FIG. 1 is a development view of a unit cell.

FIG. 1 is a development view of the unit cell. The unit cell 10 forms a sandwich structure in which separators 30A, 30B are disposed to either side of a membrane electrode assembly 20. To explain in detail, the membrane electrode assembly 20 is formed by disposing an anode 22 and a cathode 23 to either side of a solid polymer electrolyte membrane (electrolyte membrane) 21 consisting of, for example, a fluorine electrolyte material. The anode side separator 30A is disposed facing the anode 22 of the membrane electrode assembly 20, and the cathode side separator 30B is disposed facing the cathode 23 of the membrane electrode assembly 20. Both separators 30A, 30B are composed of a carbon material, for example.

In FIG. 1, a fuel gas supply port 11 through which the fuel gas to be used (e.g., hydrogen gas) flows is provided at the upper right corners of the membrane electrode assembly 20 and the separators 30A, 30B, while an anode off-gas exhaust port 12 through which used fuel gas (referred to as "anode off-gas" hereinafter) flows is provided at a diagonal position at the lower left corners of the membrane electrode assembly 20 and the separators 30A, 30B. Further, an oxidizing gas supply port 13 through which the oxidizing gas to be used (e.g., air) flows is provided at the upper left corners of the membrane electrode assembly 20 and the separators 30A, 30B, while a cathode off-gas exhaust port 14 through which the used oxidizing gas (referred to as "cathode off-gas" hereinafter) flows is provided to a diagonal position at the lower right corners of the membrane electrode assembly 20 and the separators 30A, 30B. A coolant supply port 15 through which coolant (coolant) to be used flows is provided to the middle area on the top side of the membrane electrode assembly 20 and the separators 30A, 30B, while a coolant drain port 16 through which the used coolant flows is provided to a diagonal position at the middle area on the bottom side of the membrane electrode assembly 20 and the separators 30A, 30B.

A concavity 52, formed roughly in the shape of a rectangle as seen from the planar view, is provided on the surface opposing the membrane electrode assembly 20 at the cathode side separator 30B. This concavity 52 is for causing the oxidizing gas to flow along the membrane electrode assembly 20. This concavity is connected to the cathode off-gas exhaust port 14 and the oxidizing gas supply port 13, thereby forming an oxidizing gas flow path 52. A plurality of guide projections 53 are provided in parallel to each other within the oxidizing gas flow path 52 so as to guide the oxidizing gas to flow from up to down. Note that the surface opposite the membrane electrode assembly 20 at the cathode side separator 30B is formed to be a flat surface.

Further, a seal member 70B is provided to the surface of the cathode side separator 30B that is opposite the membrane electrode assembly 20. This seal member 70B is a unitary molded article of such as silicon rubber, fluororubber, ethylene propylene rubber, butyl rubber, etc. This seal member 70B surrounds the periphery of the oxidizing gas supply port 13, the oxidizing gas flow path 52 and the cathode off-gas exhaust port 14, while at the same time separately surrounding the fuel gas supply port 11, the anode off-gas exhaust port 12, the coolant supply port 15, and the coolant drain port 16, respectively.

Note that while not shown in the figures, a concavity, formed roughly in the shape of a rectangle as seen from the planar view, is provided on the surface opposite the membrane electrode assembly 20 on the anode side separator 30A. This concavity is for causing the fuel gas to flow along the membrane electrode assembly 20. This concavity is connected to the fuel gas supply port 11 and the anode off-gas exhaust port 12, thereby forming a fuel gas flow path 51 (refer to FIG. 2).

Further, a seal member 70A (refer to FIG. 2) is provided to the surface opposite the membrane electrode assembly 20 on the anode side separator 30A. This seal member surrounds the periphery of the fuel gas supply port 11, the fuel gas flow path and the anode off-gas exhaust port 12, while at the same time separately surrounding the oxidizing gas supply port 13, the cathode off-gas exhaust port 14, the coolant supply port 15, and the coolant drain port 16, respectively.

A concavity 32, formed roughly in the shape of a rectangle as seen from the planar view, is provided on the surface opposite the membrane electrode assembly 20 on the anode side separator 30A. This concavity is connected to the coolant supply port 15 and the coolant drain port 16, forming a coolant flow path 32. A plurality of guide projections 33 are provided within the coolant flow path 32 so as to guide the coolant to flow from up to down.

Further, a seal member 70C is provided to the surface opposite the membrane electrode assembly 20 on the anode side separator 30A. This seal member 70C surrounds the periphery of the coolant supply port 15, the coolant flow path 32 and the coolant drain port 16, while at the same time separately surrounding each of the fuel gas supply port 11, the anode off-gas exhaust port 12, the oxidizing gas supply port 13, and the cathode off-gas exhaust port 14.

Figure 2:
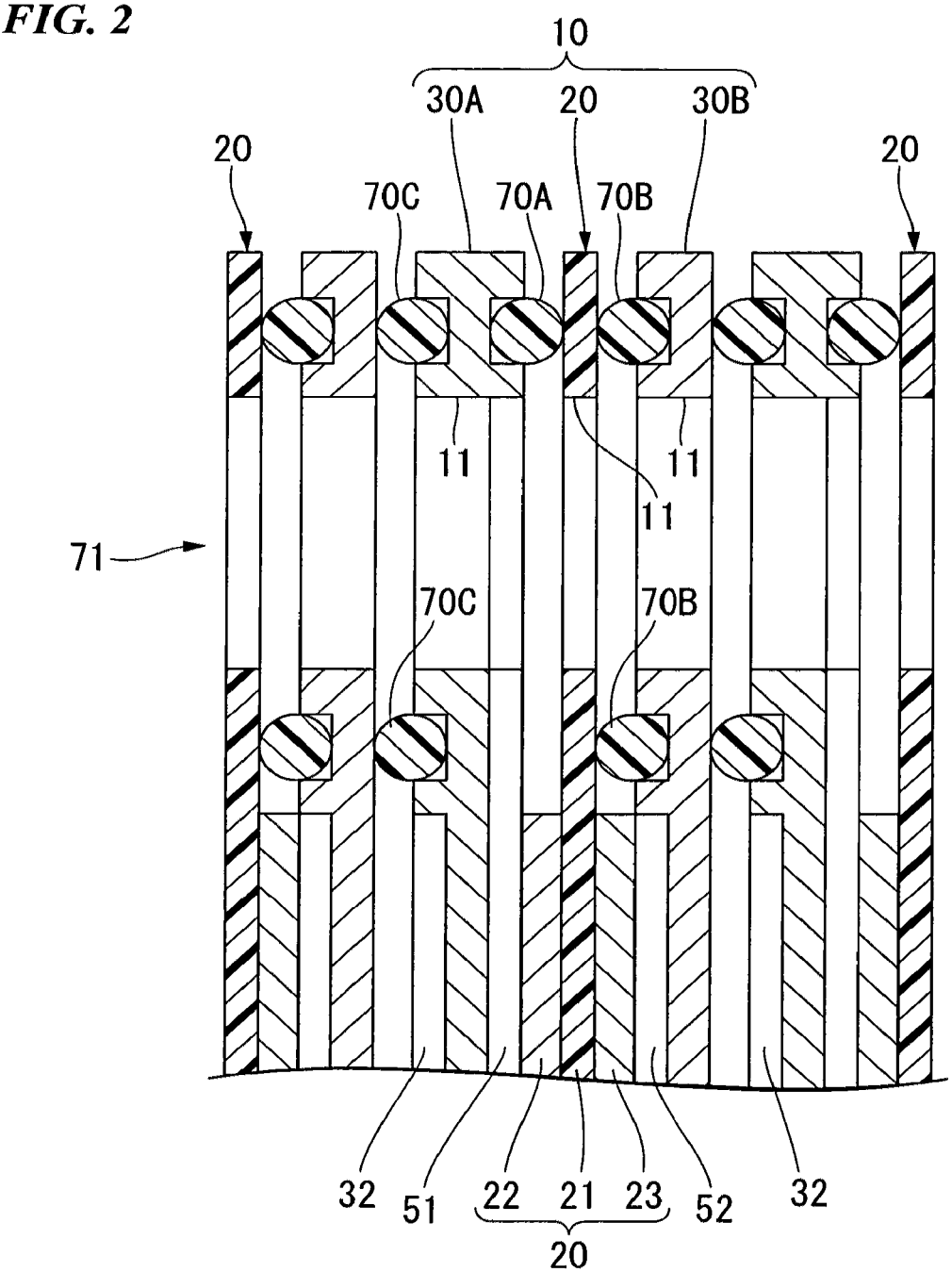
FIG. 2 is a cross-sectional view from the side of a fuel cell stack which is formed by stacking unit cells.

FIG. 2 shows a fuel cell stack in which unit cells are stacked together, and is a side view in cross-section of the part corresponding to the line A-A in FIG. 1. As shown in FIG. 2, the cathode side separator 30B is adhered to the membrane electrode assembly 20 via the seal member 70B, while the anode side separator 30A is adhered to the membrane electrode assembly 20 via the seal member 70A. As a result, an oxidizing gas flow path 52 is formed between the cathode side separator 30B and the membrane electrode assembly 20, and a fuel gas flow path 51 is formed between the anode side separator 30A and the membrane electrode assembly 20.

Further, the anode side separator 30A is adhered to the adjacent cathode side separator 30B via the seal member 70C. As a result, a coolant flow path 32 is formed between the separators 30A, 30B.

When hydrogen gas or the like is supplied as a fuel gas to the fuel gas flow path 51, and air or the like containing oxygen is supplied as the oxidizing gas to the oxidizing gas flow path 52, then the hydrogen ions generated through the catalytic reaction at the anode 22 pass through the solid polymer electrolyte membrane 21 and move toward the cathode 23. These hydrogen ions undergo an electrochemical reaction with oxygen at the cathode 23, generating electrical power and water. A portion of the water generated at the cathode 23 side permeates the solid polymer electrolyte membrane 21, and spreads to the anode 22 side. As a result, generated water is present at the anode 22 side as well.

A communicating hole 71 for supplying fuel gas is formed by mutually connecting the fuel gas supply ports 11 formed in the separators 30A, 30B and the membrane electrode assembly 20. This communicating hole 71 for supplying fuel gas is connected to the fuel gas flow path 51 of each of the unit cells 10.

Similarly, a communicating hole for exhausting the anode off-gas is formed by mutually connecting the anode off-gas exhaust ports 12 that are formed in each of the unit cells 10 shown in FIG. 1. Further, a communicating hole for supplying oxidizing gas is formed by mutually connecting the oxidizing gas supply ports 13, and a communicating hole for exhausting the cathode off-gas is formed by mutually connecting the cathode off-gas exhaust ports 14. A communicating hole for supplying the coolant is formed by mutually connecting the coolant supply ports 15, and a communicating hole for draining the coolant is formed by mutually connecting the coolant drain ports 16.

(Fuel Cell System)

Figure 3:
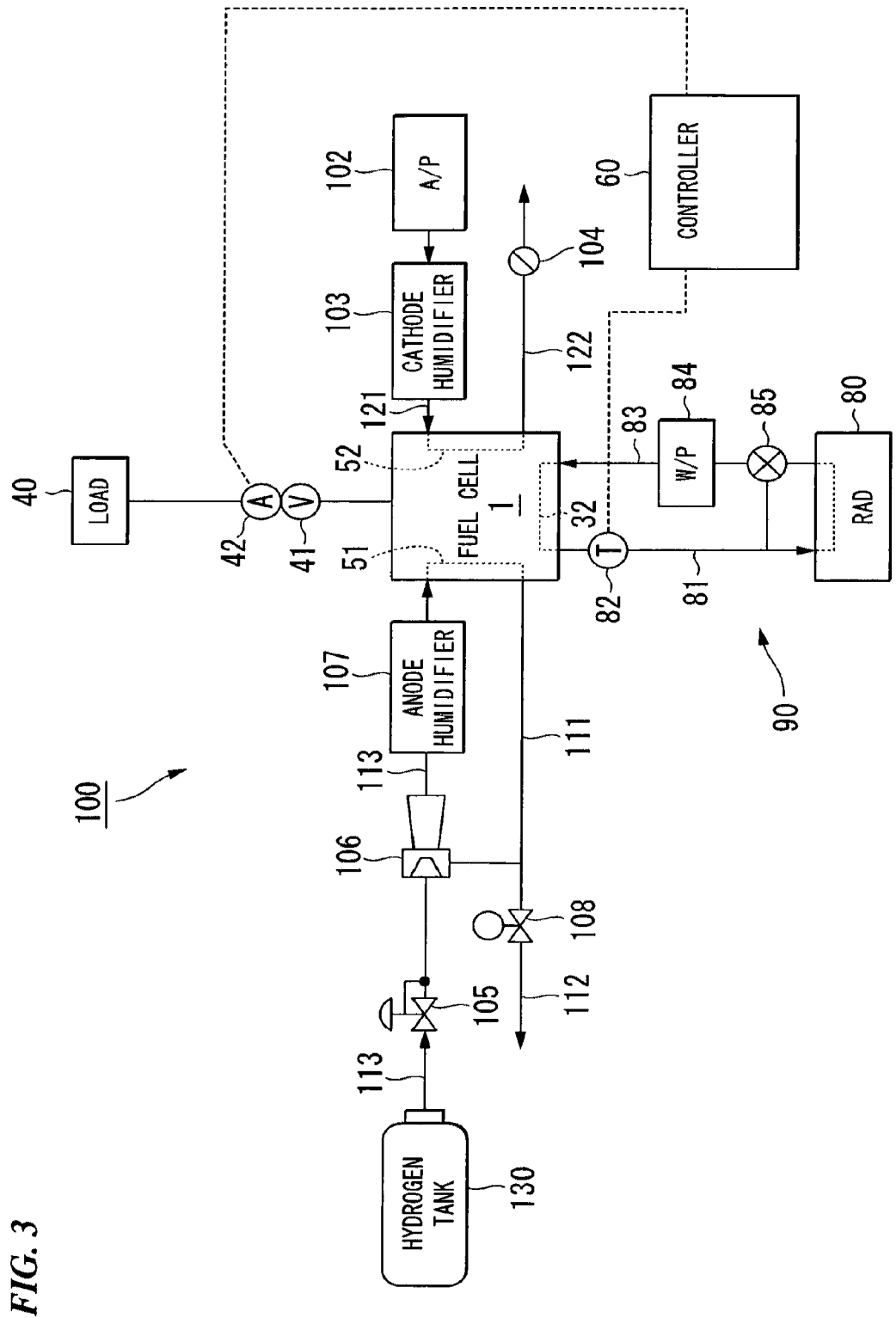
FIG. 3 is a schematic block diagram of the fuel cell system provided with a fuel cell stack.

FIG. 3 is a schematic diagram of the fuel cell system provided with a fuel cell stack. The above-described fuel cell stack (referred to as "fuel cell" or "FC" (fuel cell) hereinafter) 1 carries out the generation of electrical power through an electrochemical reaction between an oxidizing gas such as air and a fuel gas such as hydrogen gas. Fuel gas supply pipe 113 is connected to a communicating opening for supplying the fuel gas in the fuel cell 1, and a hydrogen tank 130 is connected at a position upstream thereto. Further, oxidizing gas supply pipe 121 is connected to a communicating opening for supplying the oxidizing gas in the fuel cell 1, and an air pump (referred to as "A/P" hereinafter) 102 is connected at a position upstream thereto as a reaction gas supply device. Note that an anode off-gas recovery pipe 111 is connected to a communicating opening for exhausting the anode off-gas in the fuel cell 1, and a cathode off-gas exhaust pipe 122 is connected to a communicating opening for exhausting the cathode off-gas.

The pressure of the hydrogen gas that is supplied to the fuel gas supply pipe 113 from the hydrogen tank 130 is reduced by a regulator 105, after which it passes through an ejector 106, is humidified by an anode humidifier 107, and is then supplied to the fuel gas flow path 51 of the fuel cell 1. A circulating design is provided in which the anode off-gas passes through the anode off-gas recovery pipe 111, is drawn in by the ejector 106, combined with the flow of the hydrogen gas supplied from the hydrogen tank 130, and then supplied to the fuel cell 1 again. Note that the anode off-gas recovery pipe 111 is connected to the anode off-gas exhaust pipe 112 via a solenoid purge valve 108.

The air is pressurized by A/P 102, humidified by a cathode humidifier 103, and is supplied to the oxidizing gas flow path 52 of the fuel cell 1. The oxygen in the air is supplied for the electrical power generation as the oxidizing agent, after which it is exhausted as a cathode off-gas from the fuel cell 1, and released into the atmosphere via a back pressure regulation valve 104.

The fuel cell system 100 is provided with a cooling device 90 for cooling the fuel cell 1 by passing a coolant within the fuel cell. As the cooling device 90, a coolant supply pipe 83 is connected to a communicating opening for supplying a coolant in the fuel cell 1, and a coolant drain pipe 81 is connected to a communicating opening for draining the coolant in the fuel cell 1. The upstream end of the coolant supply pipe 83 and the downstream end of the coolant drain pipe 81 are connected to a radiator 80. A water pump (hereinafter referred to as "W/P") 84 is provided to the coolant supply pipe 83 as a coolant supply device for circulating the coolant between the fuel cell 1 and the radiator 80. The W/P 84 is connected on the same axis as the A/P 102, and is linked and driven together therewith. Further, a coolant temperature sensor 82 is provided to the coolant drain pipe 81 for measuring the temperature of the coolant after it has cooled the fuel cell. Further, a thermo valve 85 is provided to the coolant supply pipe.

A load 40 such as a motor, etc., which is driven by the fuel cell 1, is connected to the fuel cell 1. A voltage sensor 41 and a current sensor 42 are provided for measuring the voltage and current output from the fuel cell 1 to the load 40.

The fuel cell system 100 is provided with a controller 60. The controller 60 is connected to the above-described voltage sensor 41, current sensor 42 and coolant temperature sensor 82.

(First Embodiment, Fuel Cell System)

Figure 4:
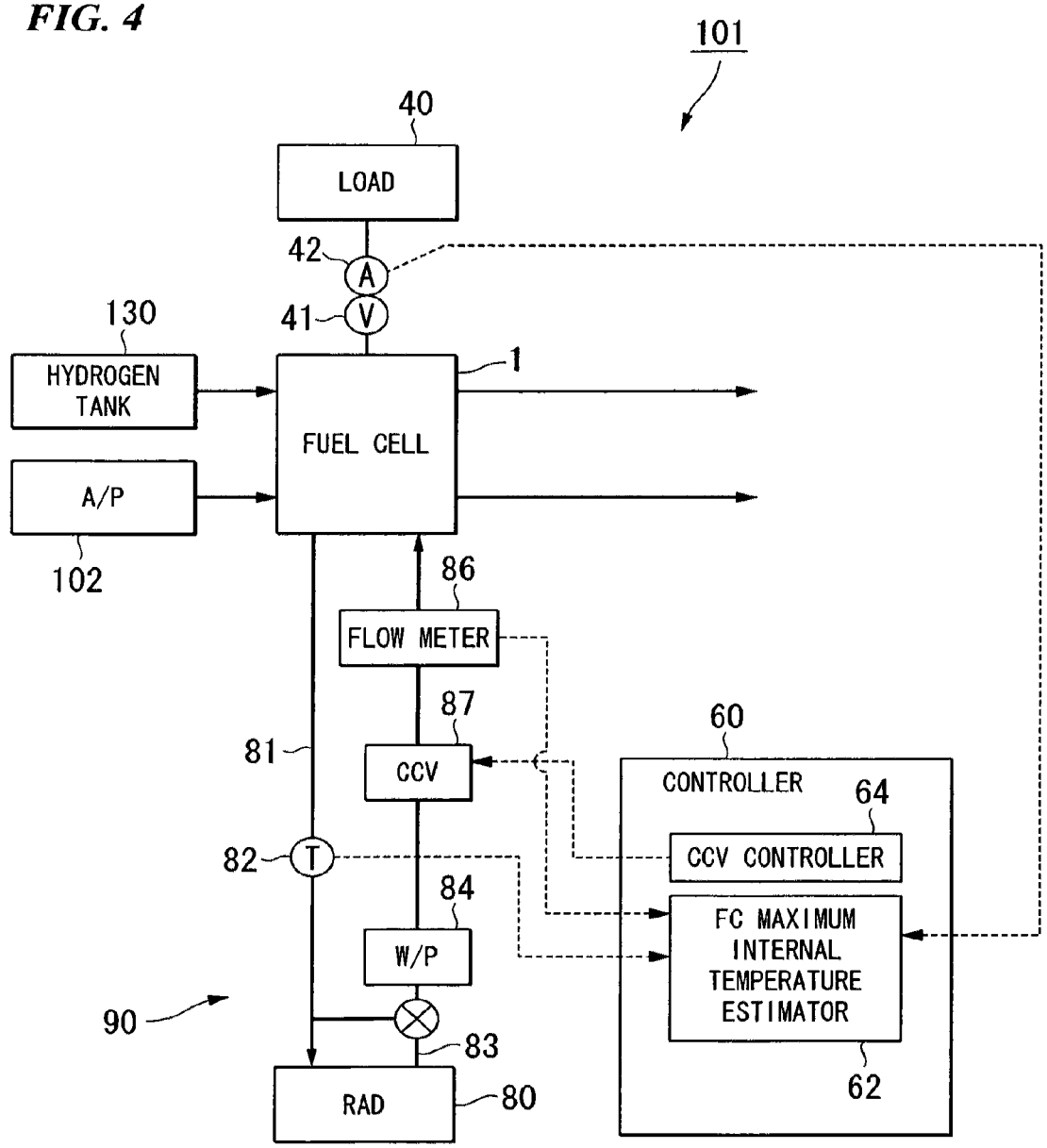
FIG. 4 is a feature block diagram of the fuel cell system according to a first embodiment of the present invention.

FIG. 4 is a feature block diagram of the fuel cell system according to the first embodiment. Note that the fuel cell system 101 according to the first embodiment is designed by providing the feature shown in FIG. 4 to the schematic block diagram of the fuel cell system 100 shown in FIG. 3. This will also be the case for the fuel cell systems according to subsequent embodiments and variant examples that follow below.

The fuel cell system 101 according to the first embodiment is provided with a flow meter 86 that measures the coolant flow rate inside the fuel cell. This flow meter 86 is connected to a coolant supply pipe 83 of the cooling device 90. A CCV (Coolant Control Valve) 87 is provided to the coolant supply pipe 83. This CCV 87 is independent of the W/P 84 (coolant supply device), and is able to freely adjust the supply flow rate of the coolant.

Controller 60 is provided with a FC maximum internal temperature estimator 62 for estimating the maximum temperature inside the fuel cell, this FC maximum internal temperature estimator 62 serving as a fuel cell operating temperature output device for outputting the operating temperature of the fuel cell. The fuel cell output voltage from the voltage sensor 41, the fuel cell output current from the current sensor, and the coolant flow rate from the flow meter 86 are each input to the FC maximum internal temperature estimator 62. The FC maximum internal temperature estimator 62 can estimate the maximum temperature inside the fuel cell based on the inputted fuel cell output and the coolant flow rate.

The controller 60 is provided with the CCV controller 64 for controlling the opening of the CCV 87 based on the estimated fuel cell maximum internal temperature.

The maximum temperature of the fuel cell can be specified to some degree based on the design conditions of the fuel cell (e.g., flow path, stack design), disposition conditions (e.g., area of disposition, environment, inclination). In other words, to some extent it is possible to predict the maximum temperature of the fuel cell during the fuel cell design phase.

The presence and extent of dispersion in the internal temperature of the fuel cell is related primarily to the fuel cell output and the coolant flow rate. The local areas of overheating when such dispersions occur are markedly apparent in the degree of temperature variation in the coolant and the reaction gas, respectively. Therefore, a map of the correlation between the predicted temperature at the area of maximum temperature, and the measured temperature values for the coolant and the reaction gas can be obtained through experiment during the fuel cell design phase.

By inputting in advance the correlation map obtained through such experiments, it is possible to estimate the maximum temperature inside the fuel cell during generation of electrical power, based on the fuel cell output, the coolant flow rate, the reaction gas temperature, and the like.

(Fuel Cell Cooling Method)

Figure 5:
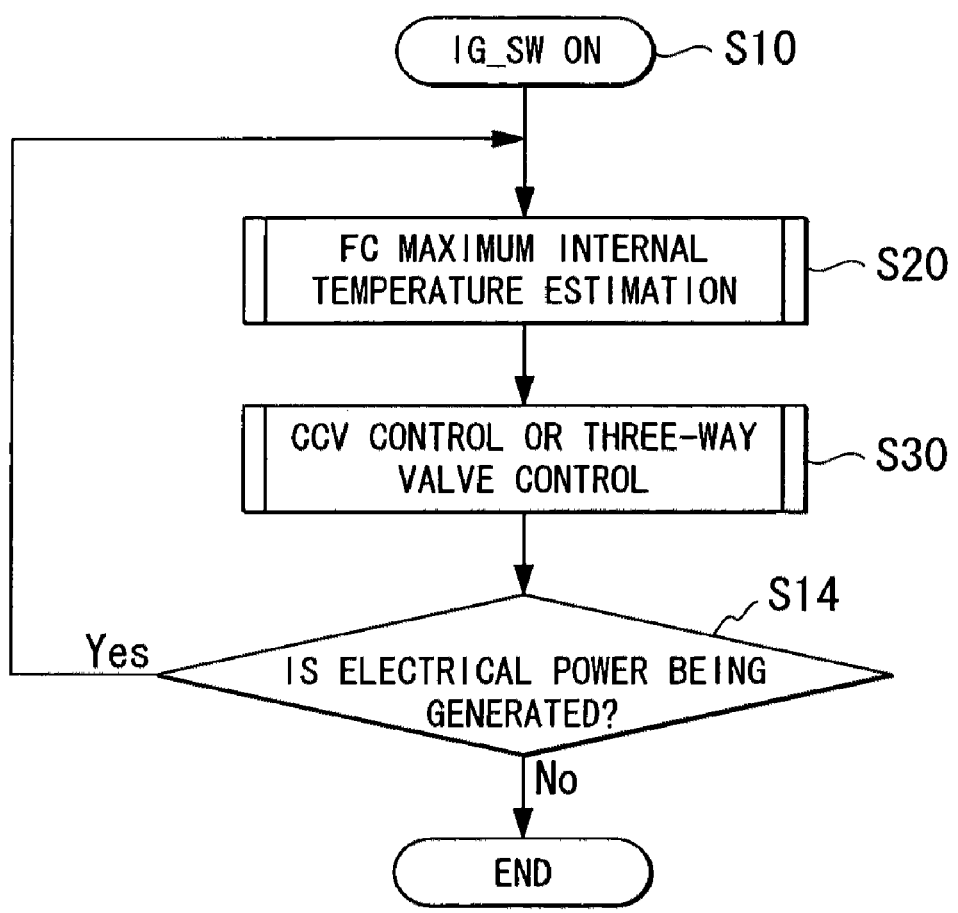
FIG. 5 is a flow chart of the cooling method for the fuel cell according to the embodiment.

FIG. 5 is a flow chart of the cooling method for the fuel cell according to the first embodiment. When the ignition switch is turned ON (S10) and warming-up operation starts, the FC maximum internal temperature estimator 62 of the controller 60 estimates the FC maximum internal temperature (S20). Estimation of the FC maximum internal temperature will now be explained below.

Figure 6A:
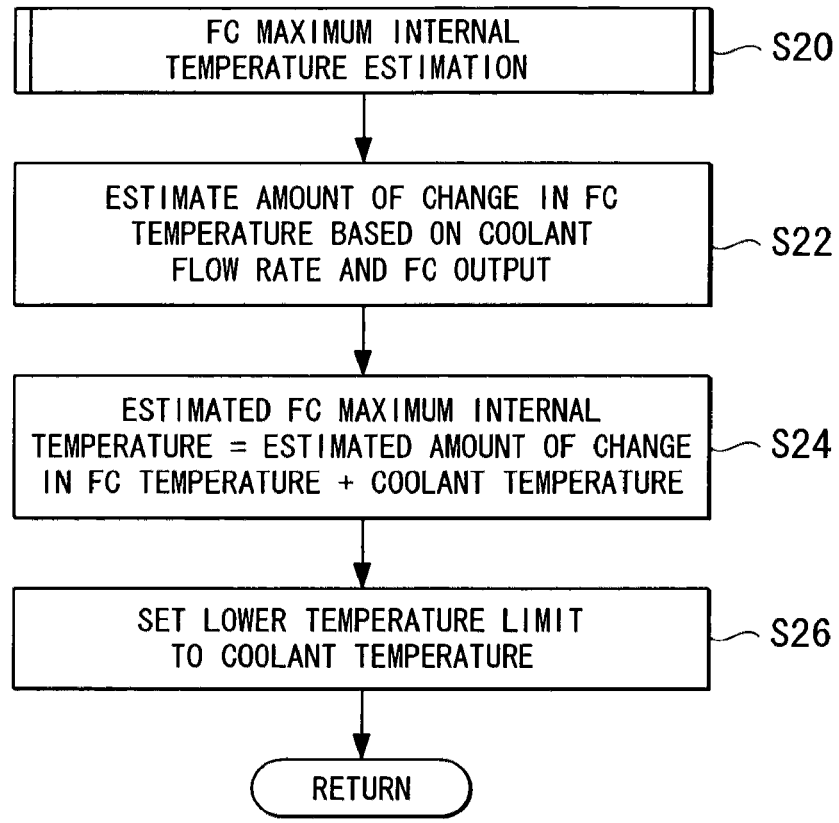
FIG. 6A is a flow chart of the subroutine for estimating the FC maximum internal temperature.

FIG. 6A is a flow chart of the subroutine for estimating the FC maximum internal temperature. First, the amount of change in the FC temperature is estimated using the coolant flow rate and the FC output (S22). Since the coolant flow rate inside the fuel cell is not sufficient during warming-up operation of the fuel cell, a dispersion (variation) in the temperature inside the fuel cell occurs. Namely, the temperature is different for each of the stacked unit cells, and there is a temperature distribution on the surface of the membrane electrode assembly in each unit cell. For this reason, there is a difference between the maximum temperature inside the fuel cell and the coolant temperature. In S22, the amount of change in the FC temperature change, which is the above-described temperature difference, is estimated. The estimation of the amount of change in the FC temperature will now be explained.

Figure 6B:
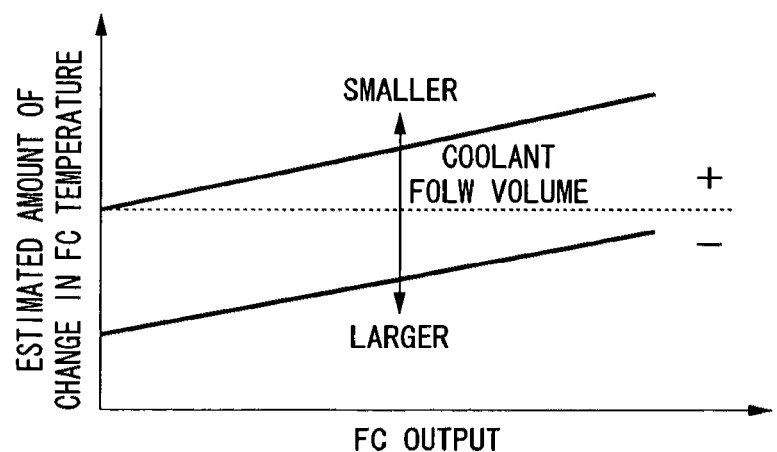
FIG. 6B is a map for estimating the amount of change in the FC temperature.

FIG. 6B is a map for estimating the amount of change in the temperature of the FC. The FC output is plotted on the horizontal axis and the FC temperature change estimated value is plotted on the vertical axis. In general, the greater the FC output becomes, the larger the amount of change in the FC temperature becomes. This is because the reaction inside the fuel cell becomes more active, and the maximum temperature inside the fuel cell becomes higher as the FC output increases. Moreover, the lower the coolant flow rate becomes, the larger the amount of change in the FC temperature becomes. This is because cooling within the fuel cell becomes less sufficient and the maximum temperature inside the fuel cell becomes higher as the coolant flow rate becomes less. By applying the FC output and the coolant flow rate to the map in FIG. 6B, it is possible to obtain an estimated value for the amount of change in temperature inside the fuel cell.

Returning to FIG. 6A, the estimated value for the change in the FC internal temperature that is obtained in S22 is added to the coolant temperature, to obtain the FC maximum internal temperature estimated value (S24). The coolant temperature is set as the lower limit (S26). Namely, when the FC maximum internal temperature estimated value obtained in S24 is less than the coolant temperature, then the coolant temperature is used as the FC maximum internal temperature estimated value. In this manner, it is possible to adjust the temperature inside the fuel cell so that the current FC maximum internal temperature does not exceed the acceptable upper temperature limit.

Next, as shown in FIG. 5, the CCV controller 64 of the controller 60 carries out CCV control (S30). This CCV control will now be explained.

Figure 7A:
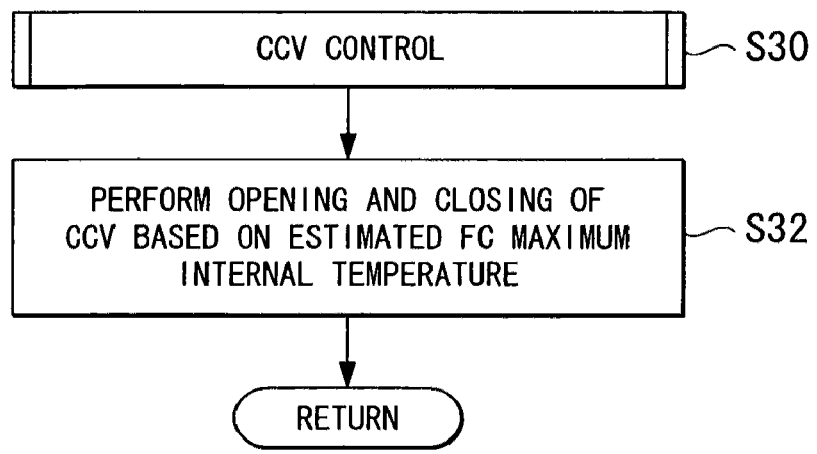
FIG. 7A is a flow chart of the subroutine for CCV control.

FIG. 7A shows a flow chart of the subroutine for CCV control. Opening and closing of the CCV is carried out using the estimated value for the FC maximum internal temperature (S32).

Figure 7B:
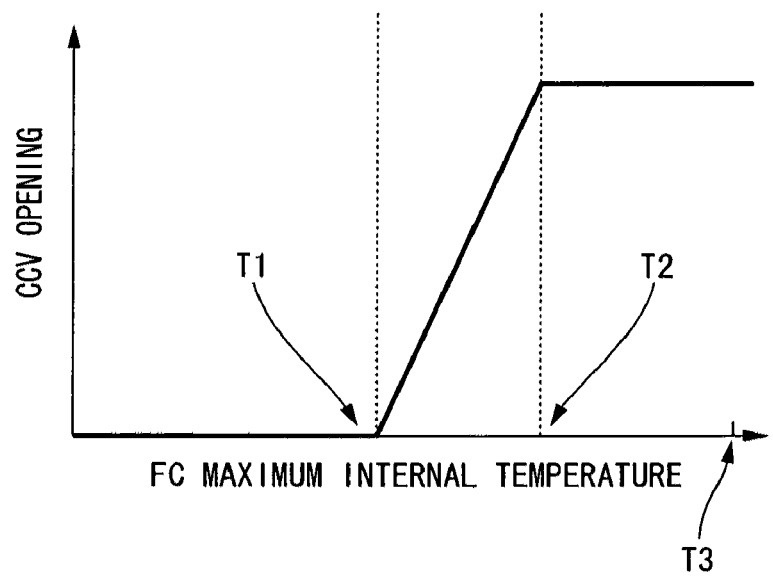
FIG. 7B is a map for determining the CCV opening.

FIG. 7B shows the map for determining the CCV opening when carrying out the aforementioned opening and closing of the CCV. The FC maximum internal temperature is plotted along the horizontal axis and the CCV opening is plotted along the vertical axis. As described above, the A/P 102 is driven in response to the FC output, and the W/P 84, which is the coolant supply device, is driven linked with the A/P 102. When the FC maximum internal temperature is low during warming-up operation, then the CCV opening is made small (or completely closed) in order to limit the supply of coolant to the fuel cell. Conversely, when the FC maximum internal temperature is greater than T1 but less than T2, then the CCV opening is continuously varied. When the FC maximum internal temperature exceeds T2, then the CCV opening is completely opened, to maximize the supply of coolant to the fuel cell. Here, T1 is a preset temperature value at which opening of CCV is initiated when the temperature inside the fuel cell rises. T2 is the upper temperature limit at which the CCV must be completely opened so that the membrane electrode assembly does not exceed its acceptable upper temperature limit T3. In other words, T2 is the upper temperature limit provided so that the area of the fuel cell that reaches the maximum internal temperature does not exceed the acceptable upper temperature limit T3 of the membrane electrode assembly when the fuel cell has been cooled with maximum efficiency. By controlling the CCV by setting the opening as described above, it is possible to carry out warming-up operation with good efficiency, and to maintain the FC maximum internal temperature below the acceptable upper temperature limit.

Figure 8:
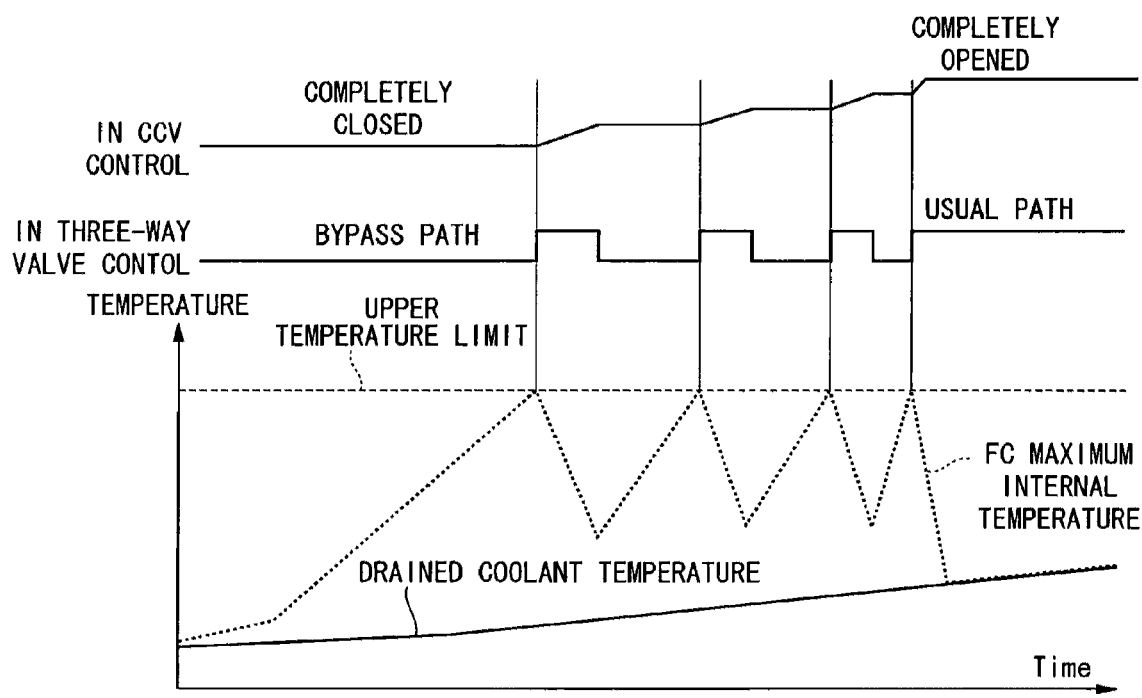
FIG. 8 is a graph showing the change in the FC maximum internal temperature in the embodiment.

FIG. 8 is a graph showing the change in the FC maximum internal temperature in the first embodiment. When the FC maximum internal temperature approaches the upper temperature limit, the CCV opening is increased, thereby decreasing the FC maximum internal temperature. When the increase in the CCV opening is stopped, the FC maximum internal temperature again begins to increase, approaching the upper temperature limit. At this point, the CCV opening is again increased, causing the FC maximum internal temperature to fall. Note that if the CCV opening is completely opened, the FC maximum internal temperature can be made to be roughly equivalent to the coolant temperature.

Subsequently, as shown in FIG. 5, a decision is made as to whether or not the fuel cell is generating electrical power (S14). If the decision is YES, the above process is carried out again, and if the decision is NO, the fuel cell cooling method according to this embodiment is brought to end.

Figure 25A:
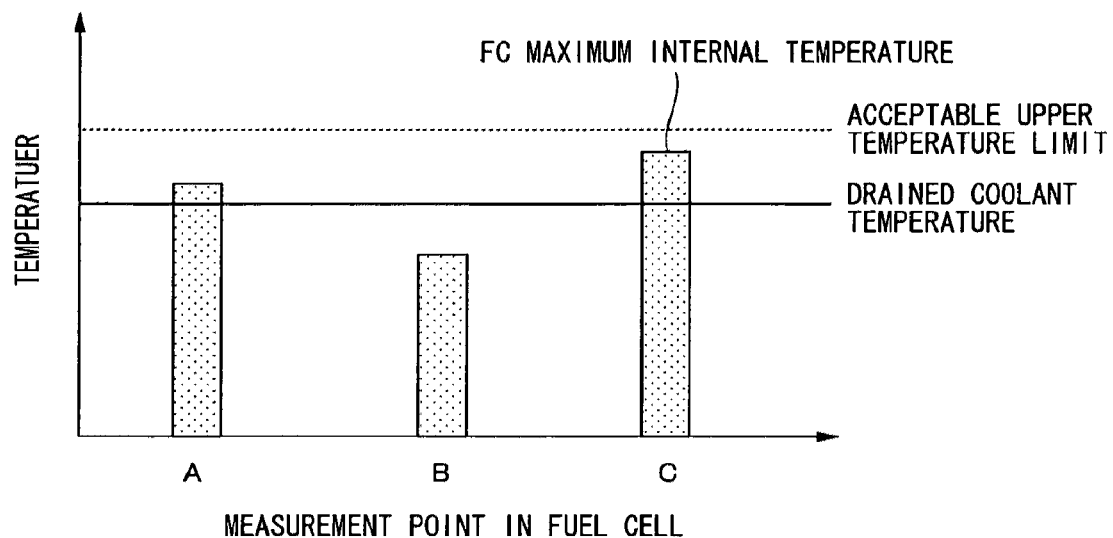
FIG. 25A is a graph showing the relationship between the coolant temperature, the FC maximum internal temperature and the acceptable upper temperature limit in the fuel cell system according to the present invention.
Figure 25B:
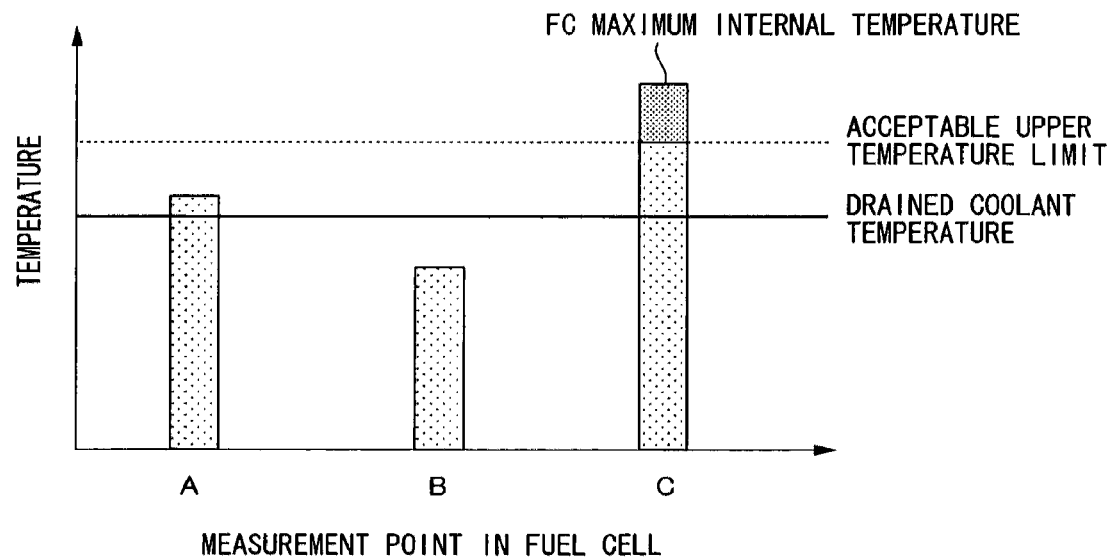
FIG. 25B is a graph showing the relationship between the coolant temperature, the FC maximum internal temperature and the acceptable upper temperature limit in a fuel cell system according to the prior art.

As explained in detail above, the fuel cell system 101 according to the embodiment shown in FIG. 4 is provided with a FC maximum internal temperature estimator 62 and a CCV controller 64 for controlling the coolant flow rate so that the maximum temperature inside the fuel cell is controlled to be below the acceptable upper temperature limit. As a result of this design, even when the FC maximum internal temperature becomes higher than the coolant temperature such as shown in FIG. 25A, the FC maximum internal temperature can be held below the acceptable upper temperature limit. Therefore, deterioration of the membrane electrode assembly of the fuel cell can be avoided, making it possible to achieve an accompanying improvement in the start-up performance of the fuel cell. In other words, it is possible to reduce the duration of time required to reach the desired output during fuel cell start-up.

In addition, the FC maximum internal temperature estimator 62 is designed to estimate the maximum temperature inside the fuel cell based on the coolant flow rate and the fuel cell output during warming-up operation of the fuel cell. As a result, the maximum temperature inside the fuel cell can be estimated at low cost without adding a new device for measuring the temperature inside the fuel cell.

Further, a design is provided in which adjustment of the temperature inside the fuel cell is carried out by controlling the coolant flow rate using the CCV controller. Therefore, it is not necessary to control the fuel cell output. Moreover, the provided CCV is able to adjust the coolant flow rate independent of the W/P, even in the case of a mechanism in which the A/P is driven in response to the fuel cell output and the W/P is driven in conjunction with the A/P. As a result, the temperature inside the fuel cell can be adjusted by freely adjusting the coolant flow rate. Specifically, by reducing the coolant flow rate during warming-up operation of the fuel cell, the duration of the warming-up operation can be shortened, thereby improving start-up performance.

(First Variant Example)

Figure 9:
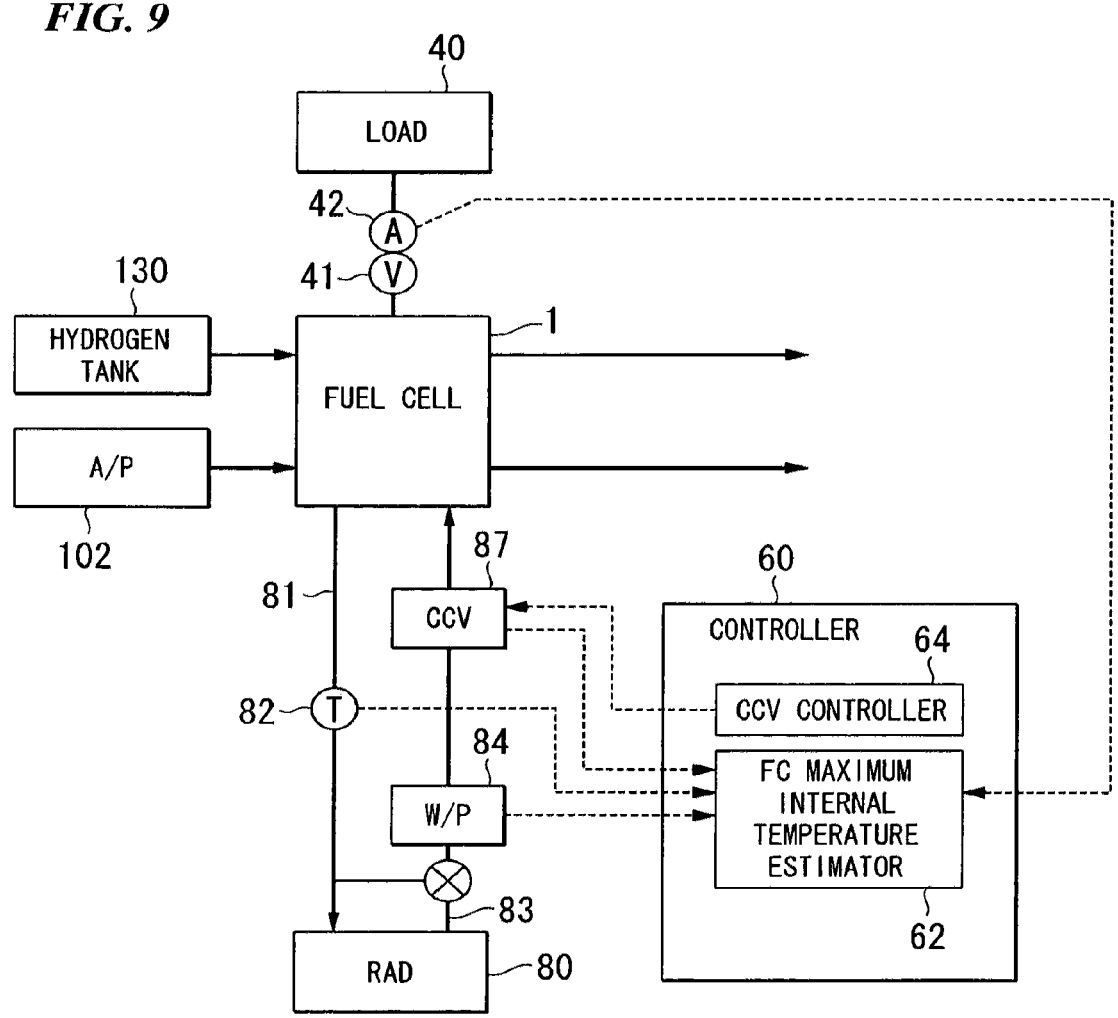
FIG. 9 is a feature block diagram of the fuel cell system according to a first variant example of the embodiment.

FIG. 9 is a feature block diagram of the fuel cell system according to a first variant example of the first embodiment. The embodiment shown in FIG. 4 is provided with a flow meter 86 for measuring the coolant flow rate. However, a flow meter is not provided to the variant example shown in FIG. 9. Note that a detailed explanation will be omitted of compositional parts that are equivalent to those of the preceding embodiments.

As in the embodiment described above, the fuel cell cooling method according to the first variant example can be performed based on the flow chart shown in FIG. 5. First, the FC maximum internal temperature estimator 62 of the controller 60 estimates the maximum temperature inside the fuel cell (S20). The estimation of the FC maximum internal temperature in the variant example will now be explained.

Figure 10:
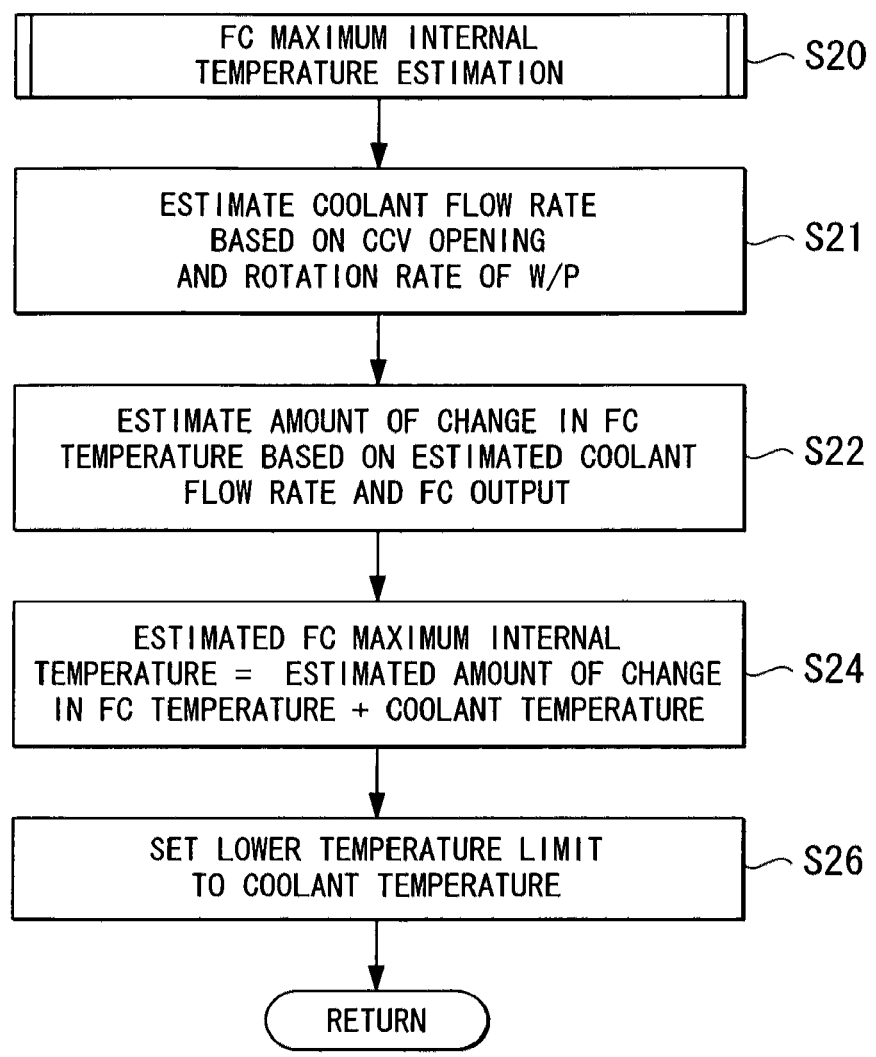
FIG. 10 is a flow chart of the subroutine for estimating the FC maximum internal temperature.

FIG. 10 is a flow chart of the subroutine for estimating the FC maximum internal temperature. In the preceding embodiment, the coolant flow rate is measured using a flow meter. In contrast, the variant example does not have a flow meter; rather, the coolant flow rate is estimated based on the CCV opening, the rotation rate of W/P 84, and the coolant temperature (S21). An approximate value for the coolant flow rate can be determined using the W/P 84, which is the coolant supply device, and the opening of the CCV 87 which can adjust the coolant flow rate independent of the W/P 84. If this approximate value is corrected using the coolant temperature measured by the coolant temperature sensor 82, then the coolant flow rate can be estimated with good accuracy.

Next, the estimated value of the coolant flow rate obtained in S21, and the FC output are employed to estimate the amount of change in the FC temperature (S22). Next, by adding the estimated value for the amount of change in the FC temperature which is obtained in S22, to the coolant temperature, it is possible to obtain an estimated value for the FC maximum internal temperature (S24). The coolant temperature is set as the lower limit of the FC maximum internal temperature (S26). Each of these processes is carried out in the same manner as in the preceding embodiment.

Returning to FIG. 5, CCV controller 64 of the controller 60 carries out CCV control (S30). This control can be carried out in the same manner as in the first embodiment.

In this manner, even in the first variant example which is not provided with a flow meter, the maximum temperature inside the fuel cell can be estimated with good accuracy, and the temperature inside the fuel cell can be adjusted thereby. Moreover, since a flow meter is not necessary to be provided, it is possible to reduce the production cost and to reduce the space required for the fuel cell system.

(Second Variant Example)

Figure 11:
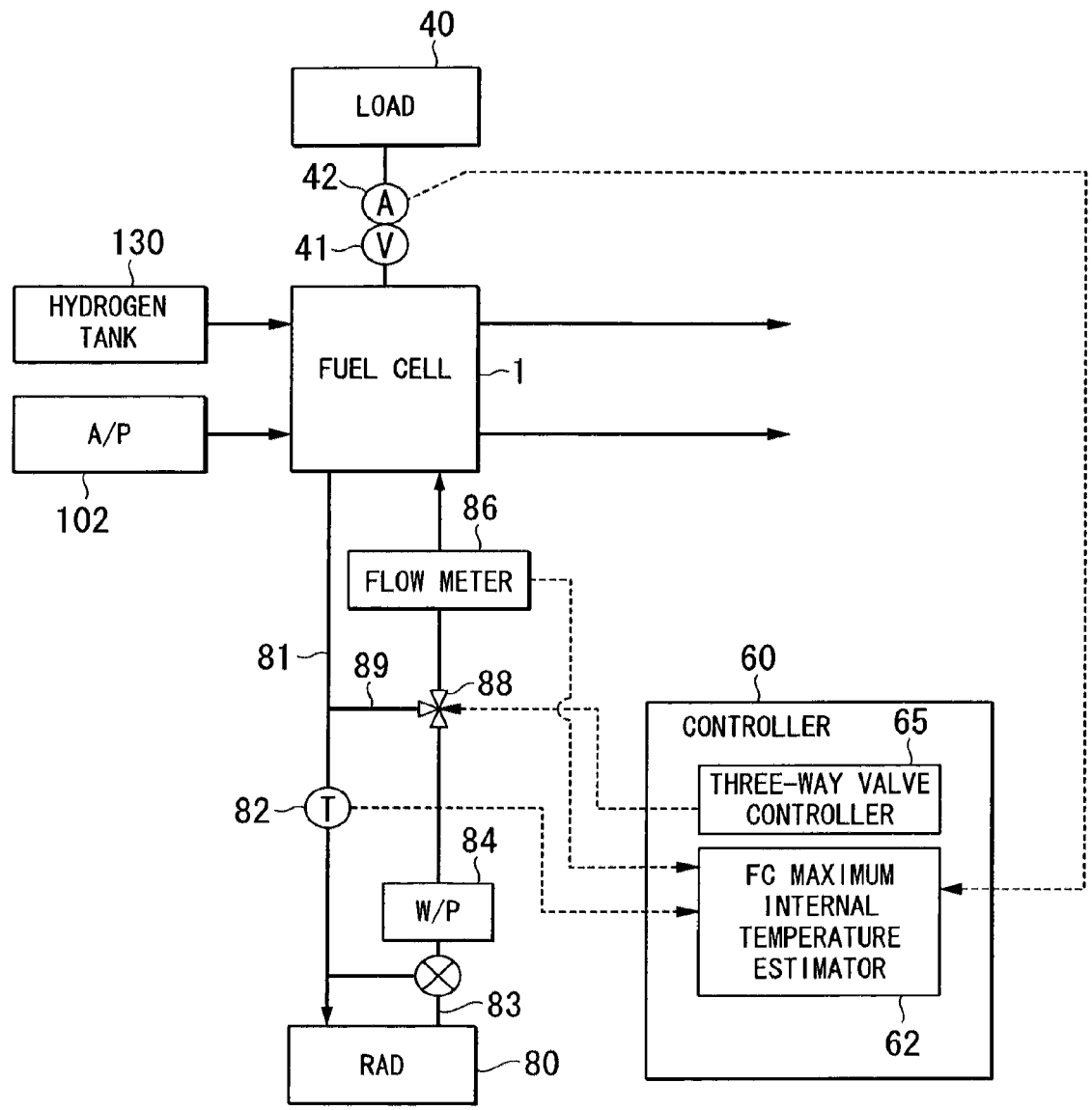
FIG. 11 is a feature block diagram of the fuel cell system according a second variant example of the embodiment.

FIG. 11 is a feature block diagram of a fuel cell system according to a second variant example of the first embodiment. In the embodiment shown in FIG. 4, a CCV 87 capable of adjusting the coolant flow rate is provided. However, in the second variant example shown in FIG. 11, a three-way valve 88 which enables switching between the coolant flow paths is provided in place of the CCV. Note that a detailed explanation will be omitted of compositional parts that are equivalent to those of the preceding embodiments.

In the variant example, a three-way valve 88 is provided to the coolant supply pipe 83. The first outlet of this three-way valve 88 is connected to the fuel cell 1, and the second outlet is connected to the coolant drain pipe 81 via a bypass path 89. A three-way valve controller 65 is provided to the controller 60 for controlling the opening/closing of the three-way valve 88.

As in the first embodiment, the cooling method for the fuel cell according to this variant example can be carried out based on the flow chart in FIG. 5. The FC maximum internal temperature estimator 62 of the controller 60 estimates the maximum temperature inside the fuel cell (S20). This control can be carried out in the same manner as in the above-described embodiment.

Next, the three-way valve controller 65 of the controller 60 carries out three-way valve control (S30). The three-way valve control as employed in this variant example will now be explained.

Figure 12A:
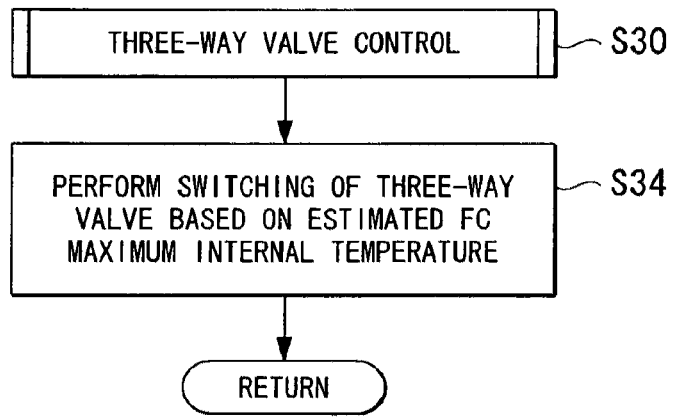
FIG. 12A is a flow chart of the subroutine for controlling the three-way valve.

FIG. 12A is a flow chart of the subroutine for three-way valve control. Here, switching of the three-way valve is carried out using the estimated valve for the FC maximum internal temperature (S34).

Figure 12B:
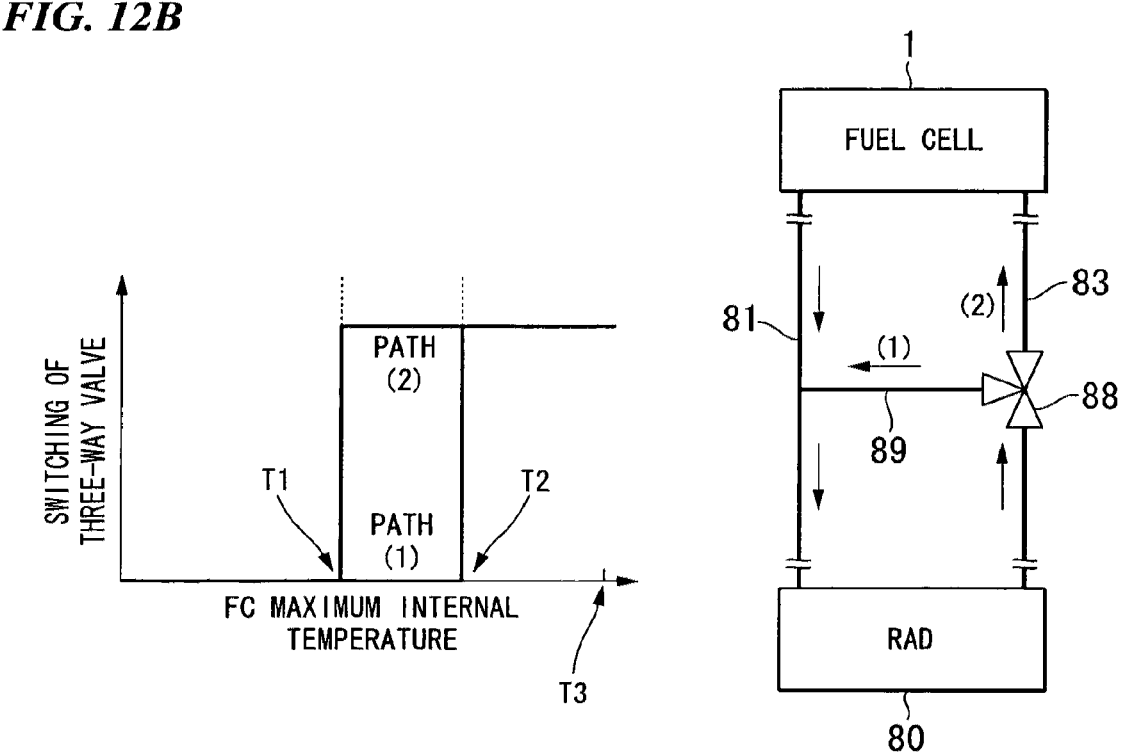
FIG. 12B is a map for switching the three-way valve.

FIG. 12B shows the map for switching the three-way valve. The FC maximum internal temperature is plotted along the horizontal axis and three-way valve switching is plotted along the vertical axis. When the FC maximum internal temperature is low during warming-up operation, then the three-way valve 88 is set to (1) the bypass path 89. In this case, coolant cooled by radiator 80 is bypassed and returned to the radiator 80, and does not flow through the inside of the fuel cell. Therefore, the fuel cell is not cooled. More specifically, the coolant can be quickly cooled since it flows only through the radiator 80. When the FC maximum internal temperature rises, exceeding T2, then the three-way valve 88 is switched to (2) the usual path connected to the fuel cell. This temperature T2 is the upper temperature limit at which the above-described switching of the three-way valve 88 must take place so that the temperature does not exceed the acceptable upper temperature limit T3 of the membrane electrode assembly. As a result, the coolant flows between the radiator 80 and the fuel cell, thereby cooling the fuel cell. When the FC maximum internal temperature falls, dropping below T1 (<T2), the three-way valve 88 is switched to the (1) bypass path 89 side. It is possible to prevent small increment opening/closing of the three-way valve 88 by switching of the three-way valve 88 at temperature T1 which is below T2. By performing three-way valve control through switching of the three-way valve as described above, it is possible to carry out warming-up operation with good efficiency, and to maintain the FC maximum internal temperature below the acceptable upper temperature limit.

FIG. 8 is a graph showing the change in the FC maximum internal temperature. When the FC maximum internal temperature approaches the allowable temperature limit, the three-way valve is switched from the bypass path to the usual path, thereby decreasing the FC maximum internal temperature. When the three-way valve is returned to the bypass path, then the FC maximum internal temperature again begins to increase, approaching the allowable temperature limit. At this point, the three-way valve is again switched to the usual path, causing the FC maximum internal temperature to fall. Note that if the three-way valve is fixed to the usual path, then the FC maximum internal temperature can be made to be roughly equivalent to the coolant temperature.

Accordingly, in the case of this variant example which is provided with a three-way valve in place of a CCV, it is also possible to maintain the maximum temperature inside the fuel cell below the acceptable upper temperature limit, and thereby prevent deterioration of the membrane electrode assembly.

(Third Variant Example)

Figure 13:
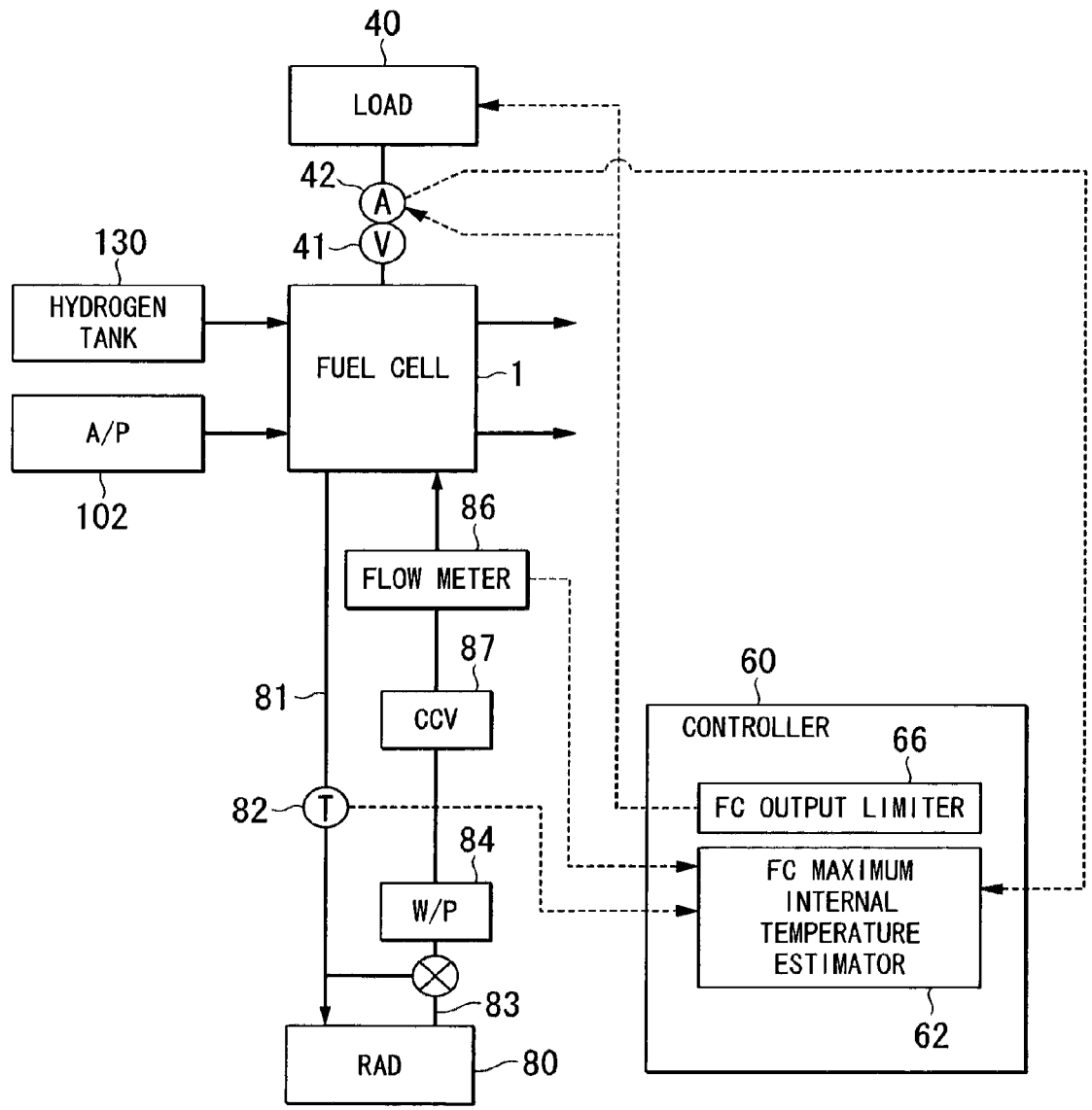
FIG. 13 is a feature block diagram of the fuel cell system according to a third variant example of the embodiment.

FIG. 13 is a feature block diagram of the fuel cell system according to a third variant example of the first embodiment. In the embodiment shown in FIG. 4, a CCV controller 64 is provided to the controller 60. In the embodiment shown in FIG. 13, however, a FC output limiter 66 is provided in place of the CCV controller. Note that a detailed explanation will be omitted of compositional parts that are equivalent to those of the preceding embodiments.

This FC output limiter 66 controls the output of the fuel cell 1 based on the estimated fuel cell maximum internal temperature. Specifically, the output of fuel cell 1 is controlled using a method such as controlling the amount of reaction gas supplied from the hydrogen tank 130 and A/P 102.

Figure 14:
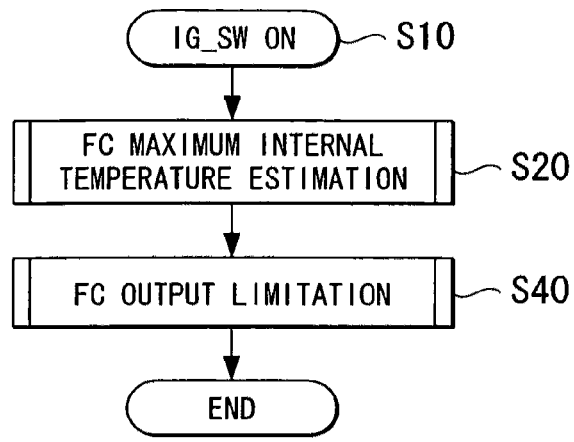
FIG. 14 is a flow chart of the cooling method for the fuel cell according to the third variant example of the embodiment.

FIG. 14 is a flow chart for the fuel cell cooling method according to this variant example. First, the FC maximum internal temperature estimator 62 of the controller 60 estimates the maximum temperature inside the fuel cell (S20). This control can be carried out in the same manner as in the first embodiment.

Next, the FC output limiter 66 of the controller 60 performs FC output limitation (S40). Output control (limitation) as carried out in this variant example will now be explained.

Figure 15A:
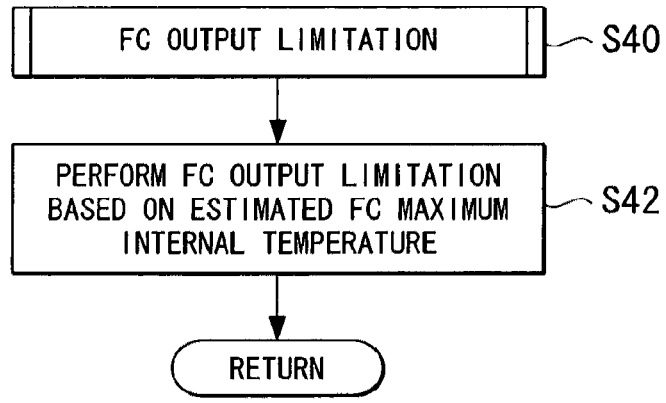
FIG. 15A is a flow chart for the subroutine for FC output limitation.

FIG. 15A is a flow chart for the subroutine for FC output limitation. Here, FC output limitation is carried out using the estimated value for the FC maximum internal temperature (S42).

Figure 15B:
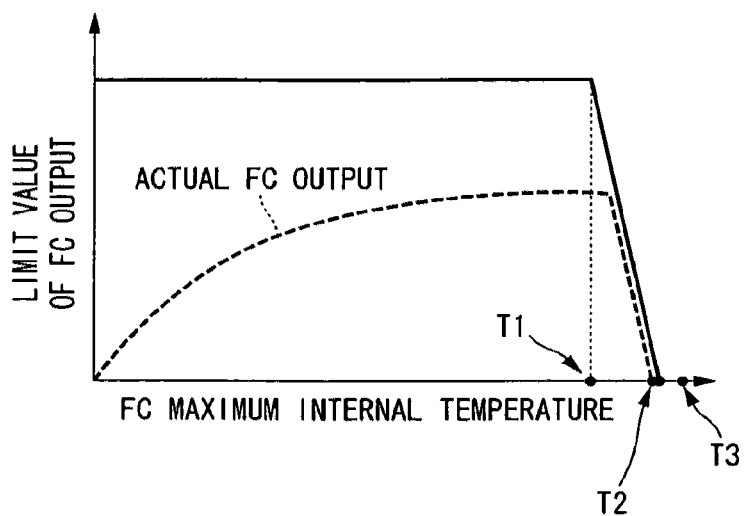
FIG. 15B is a map for FC output limitation.

FIG. 15B shows the map for the FC output limitation. The FC maximum internal temperature is plotted along the horizontal axis and the limit value of the FC output (upper limit value, preset limit value) is plotted along the vertical axis. When the FC maximum internal temperature is low during warming-up operation, then the limit value of the FC output is set to be large so that the FC output is not limited.

When the FC maximum internal temperature is greater than T1 but less than T2, then the limit value of the FC output is continuously varied. When the FC maximum internal temperature exceeds T2, then the limit value of the FC output is set to the minimum value (or 0). Here, T2 is the upper temperature limit at which the limit value of the FC output must be set to the minimum value so that the acceptable upper temperature limit T3 of the membrane electrode assembly is not exceeded. In other words, T2 is the upper temperature limit provided so that the area of the fuel cell that reaches the maximum internal temperature does not exceed the acceptable upper temperature limit of the membrane electrode assembly when the fuel cell output is minimized. By limiting the FC output through determining the limit value of the FC output in this manner, it is possible to carry out warming-up operation with good efficiency, and to maintain the FC maximum internal temperature below the acceptable upper temperature limit.

Figure 16:
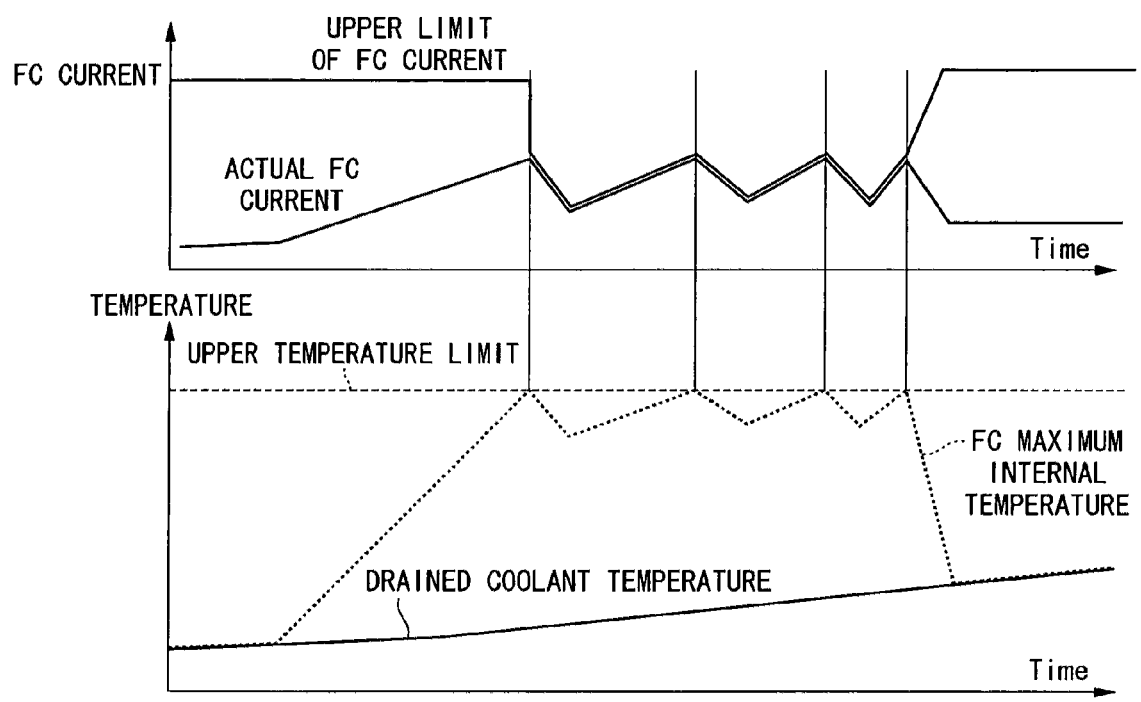
FIG. 16 is a graph showing the change in the FC maximum internal temperature in the third variant example of the same embodiment.

FIG. 16 is a graph showing the change in the FC maximum internal temperature in this variant example. In FIG. 16, the upper limit of the FC current is set as the limit value of the FC output. Note, however, that it is also acceptable to use the FC output upper limit value or the FC voltage upper limit value for this purpose. When the FC maximum internal temperature approaches the upper temperature limit, the FC current upper limit value is reduced, causing the FC output current to drop and thereby reducing the FC maximum internal temperature. When the FC current upper limit value is increased, the FC output current rises and the FC maximum internal temperature increases, again approaching the allowable temperature limit. In this case, the FC current upper limit value is again reduced, causing the FC maximum internal temperature to fall.

Accordingly, in the case of this third variant example which is provided with a FC output limiter in place of a CCV controller, it is also possible to maintain the maximum temperature inside the fuel cell to be below the acceptable upper temperature limit, and thereby prevent deterioration of the membrane electrode assembly.

(Second Embodiment)

Figure 17:
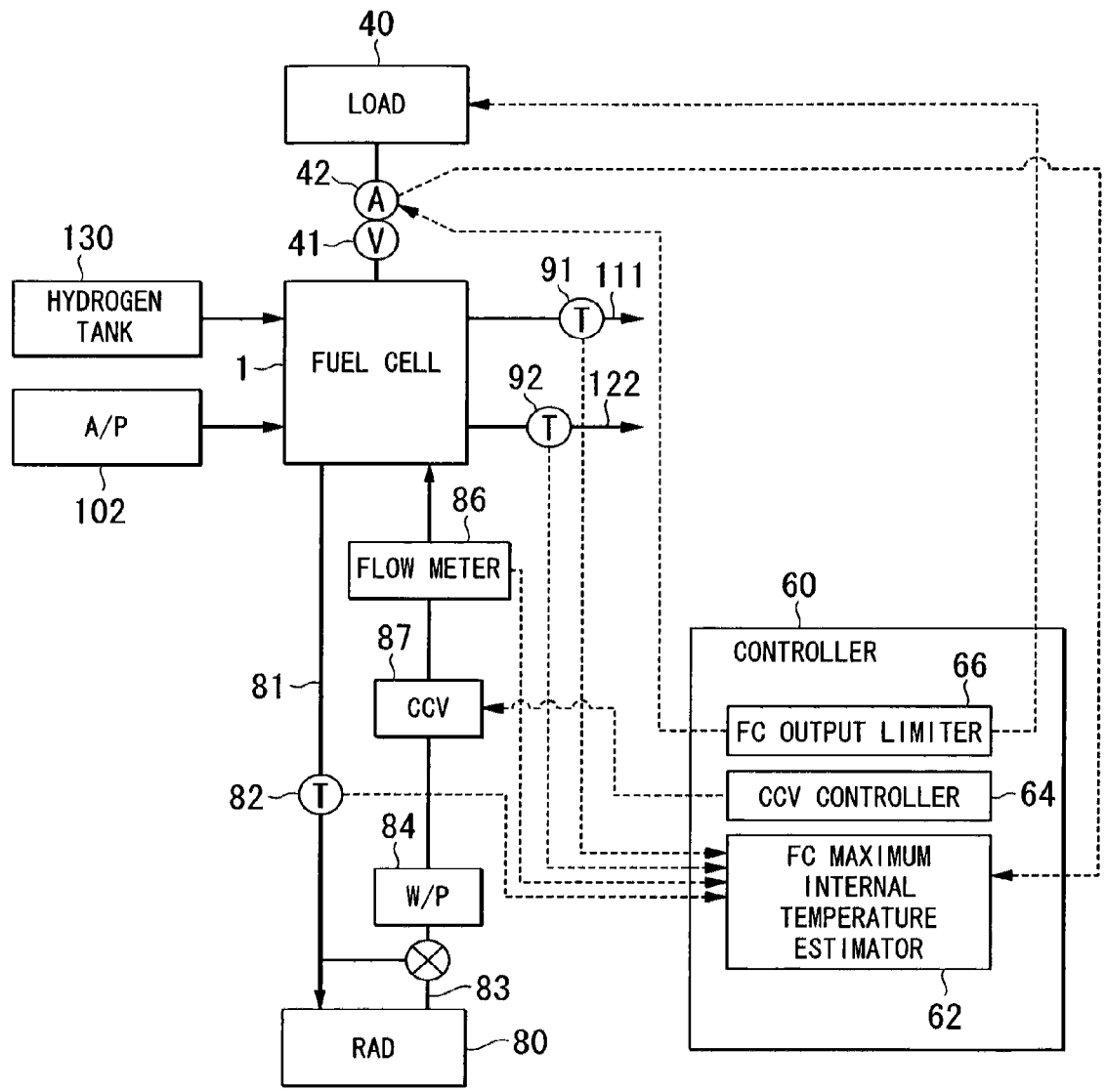
FIG. 17 is a feature block diagram of the fuel cell system according a second embodiment of the present invention.

FIG. 17 is a feature block diagram of the fuel cell system according to the second embodiment. In the first embodiment shown in FIG. 4, a CCV controller 64 is provided to the controller 60. In the embodiment shown in FIG. 17, however, a FC output limiter 66 is provided in addition to the CCV controller 64. In addition, in the first embodiment, the fuel cell maximum internal temperature is estimated based on the coolant flow rate and the fuel cell output. However, in this embodiment, in addition to the aforementioned, the fuel cell maximum internal temperature is also estimated based on the reaction gas temperature and the coolant temperature. Note that a detailed explanation will be omitted of compositional parts that are equivalent to those of the first embodiment.

In this embodiment, a CCV controller 64 and an FC output limiter 66 are provided to the controller 60. These specific structures are the same as in the first embodiment.

Figure 18:
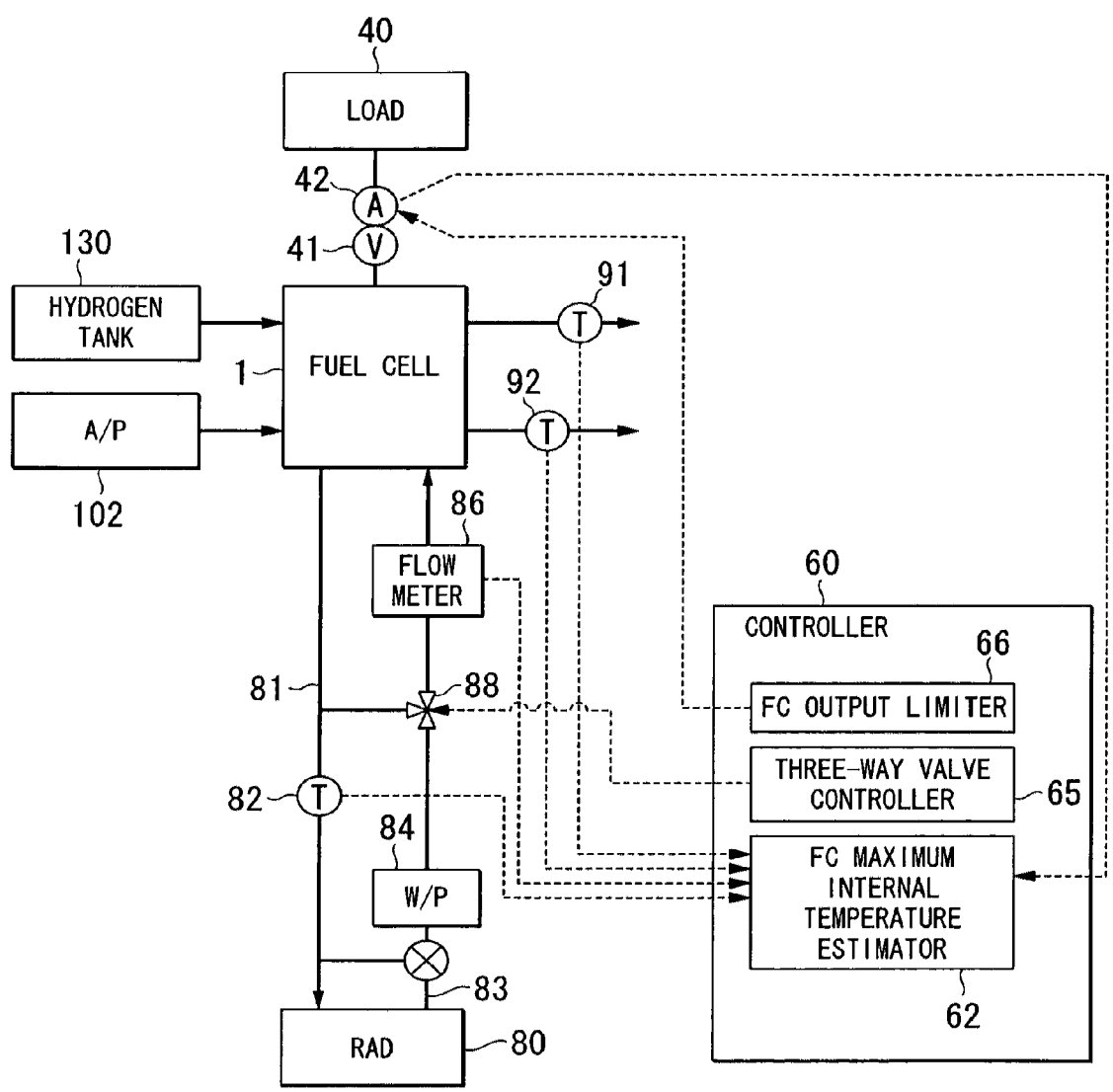
FIG. 18 is a feature block diagram of the fuel cell system according to a variant example of the same embodiment.

FIG. 18 is a feature block diagram of the fuel cell system according to a variant example of the embodiment. A three-way valve 88 and a three-way valve controller 65 are provided in the variant example shown in FIG. 18, in place of the CCV 87 and CCV controller 64 of the embodiment shown in FIG. 17. These specific structures are the same as in the second variant example of the first embodiment. Note that the three-way valve controller 65 is provided to the controller 60 in the second variant example of the first embodiment shown in FIG. 11. In the variant example shown in FIG. 18, however, an FC output limiter 66 is additionally provided.

In the embodiment shown in FIG. 17, an anode off-gas temperature sensor 91 is provided near the connector between the fuel cell and the anode off-gas recovery pipe 111. In addition, a cathode off-gas temperature sensor 92 is provided near the connector between the fuel cell and the cathode off-gas exhaust pipe 122. The anode off-gas temperature, the cathode off-gas temperature and the coolant temperature are input to the FC maximum internal temperature estimator 62 of the controller 60 from an anode off-gas temperature sensor 91, a cathode off-gas temperature sensor 92 and a coolant temperature sensor 82, respectively.

The fuel cell cooling method according to this embodiment can be carried out based on the flow chart in FIG. 5 or in FIG. 14. When adjusting the temperature of the fuel cell using CCV control, the adjustment is carried out based on the flow chart shown in FIG. 5. On the other hand, when adjusting the temperature of the fuel cell using FC output limitation, the adjustment is carried out based on the flow chart shown in FIG. 14. In either case, the FC maximum internal temperature estimator 62 of the controller 60 first estimates the FC maximum internal temperature (S20). Estimation of the FC maximum temperature in this embodiment will now be explained.

Figure 19A:
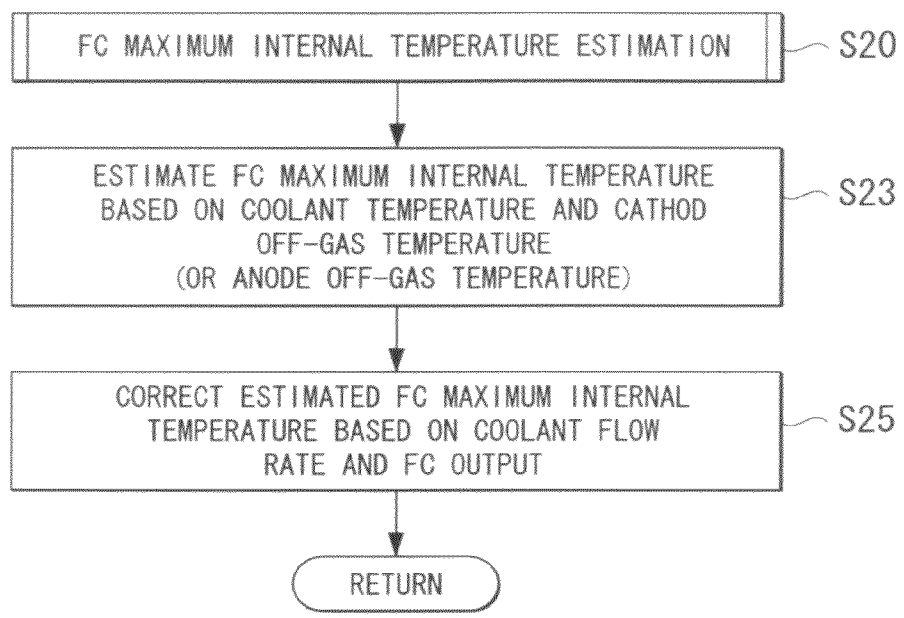
FIG. 19A is a flow chart of the subroutine for estimating the FC maximum internal temperature.

FIG. 19A is a flow chart of the subroutine for estimating the FC maximum internal temperature. First, the FC maximum internal temperature is estimated from the anode off-gas temperature or the cathode off-gas temperature, and the coolant temperature (S23).

Figure 19B:
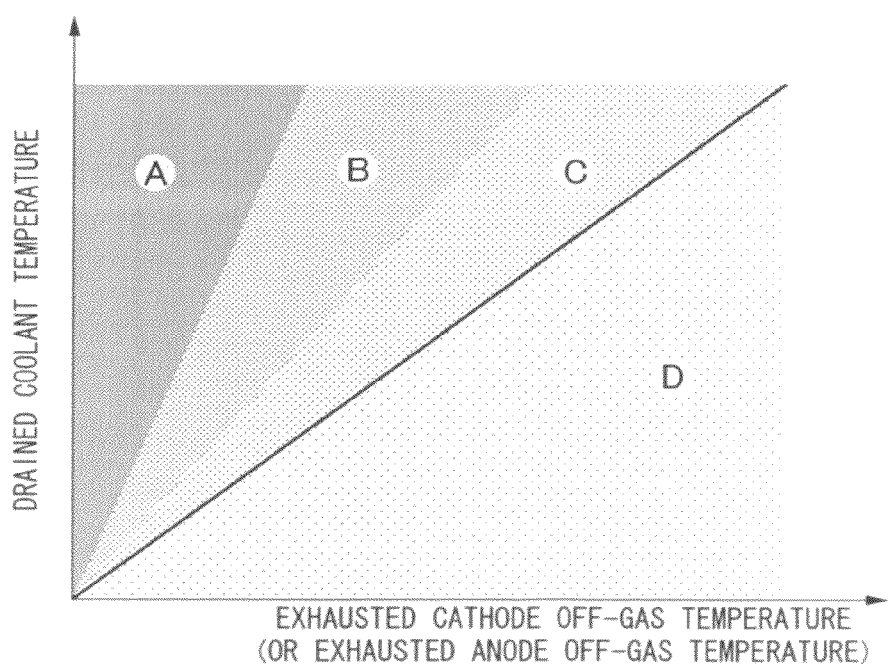
FIG. 19B is a map for estimating the FC maximum internal temperature.

FIG. 19B is a map for estimating the FC maximum internal temperature. The following explanation employs as an example in the case where estimating the FC maximum internal temperature based on the cathode off-gas temperature and the coolant temperature. However, it is also possible to estimate the FC maximum internal temperature based on the anode off-gas temperature and the coolant temperature. In general, during normal operation of the fuel cell, the coolant temperature is equivalent to the temperature of the cathode off-gas. However, because the coolant absorbs heat more readily than the reaction gas (i.e., because the specific heat of the coolant is lower than that of the reaction gas), the temperature of the coolant becomes higher than the cathode off-gas temperature during times of rapid temperature rise in the fuel cell. Therefore, in this embodiment, the FC maximum internal temperature is estimated by dividing cases into a plurality of regions in accordance with the ratio of the coolant temperature to the cathode off-gas temperature. In the region A where the ratio is large, it is estimated that the FC maximum internal temperature=the coolant temperature+30° C. In the region B where the ratio is moderate, it is estimated that the FC maximum internal temperature=the coolant temperature+20° C. In the region C where the thermal ratio is small, it is estimated that the FC maximum internal temperature=the coolant temperature+10° C. The line between the region C and the region D corresponds to a state in which the fuel cell is in normal operation wherein the coolant temperature=the cathode off-gas temperature. Note that in the region D, wherein the coolant temperature is below the cathode off-gas temperature, the coolant temperature is set as the lower limit, and FC maximum internal temperature is set to be equal to the coolant temperature.

Thereafter, as shown in FIG. 19A, the FC maximum internal temperature that is estimated in S23 is corrected based on the coolant flow rate and the FC output (S25). For example, when the coolant flow rate is low, or the FC output is large, then the estimated value of the FC maximum internal temperature is corrected upward. As a result of the preceding process, a final estimated value for the FC maximum internal temperature is obtained.

Next, CCV or three-way valve control is carried out when adjusting the temperature based on the flow chart in FIG. 5 (S30), while FC output limitation is carried out when adjusting the temperature based on the flow chart in FIG. 14 (S40).

In the second embodiment explained above, a CCV controller and an FC output limiter are provided, so that adjustment of the fuel cell temperature can be carried out in various ways. Accordingly, the maximum temperature inside the fuel cell can be reliably held below the acceptable upper temperature limit and deterioration in the membrane electrode assembly can be prevented.

In addition, the FC maximum internal temperature estimator 62 of the controller 60 in the second embodiment is constructed for estimating the fuel cell maximum internal temperature based on the fuel cell output, coolant flow rate, reaction gas temperature and the coolant temperature during warming-up operation of the fuel cell. As a result, it is possible to estimate the maximum temperature inside the fuel cell with extremely good accuracy.

(Third Embodiment)

Next, a third embodiment of the present invention will be explained. In the fuel cell system according to this embodiment, CCV control is carried out primarily and FC output limitation is carried out secondarily. This is the point of difference between the fuel cell system according to this embodiment, and that of the second embodiment in which only one of the aforementioned controls is carried out. Note that a detailed explanation will be omitted of compositional parts that are equivalent to those of the preceding embodiments.

Figure 20:
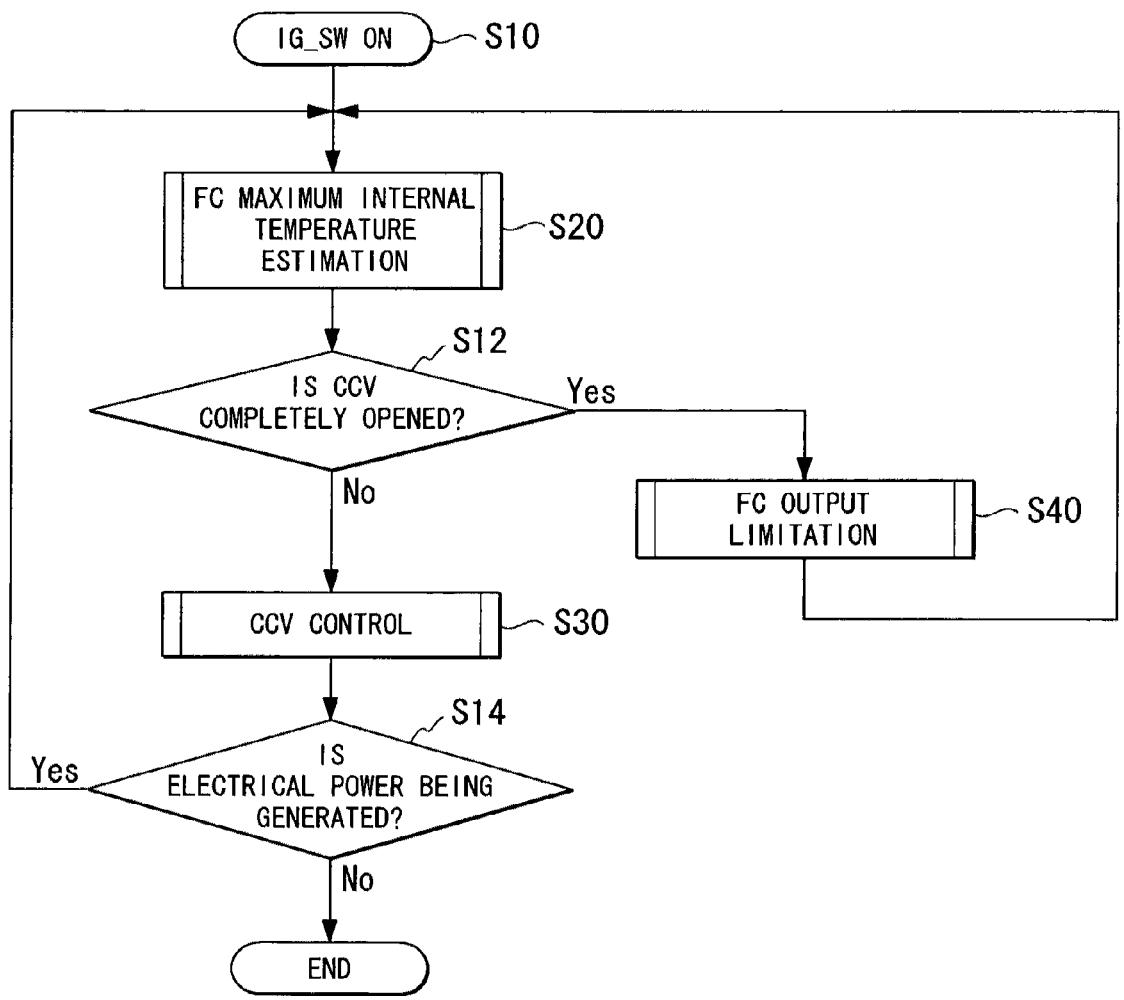
FIG. 20 is a flow chart of the cooling method for the fuel cell according to a third embodiment of the present invention.

FIG. 20 is a flow chart for the fuel cell cooling method according to the present embodiment. First, the FC maximum internal temperature estimator 62 of the controller 60 estimates the FC maximum internal temperature (S20). Next, in step S12, a decision is made as to whether or not the CCV opening is completely open. When the decision is NO, the process proceeds to S30, and the same CCV control is carried out as in the first embodiment. In contrast, when the decision in S12 is YES (i.e., the CCV is completely open), it is not possible to lower the fuel cell temperature using the present CCV control, so the process proceeds to S40 and carries out FC output limitation. FC output limitation is carried out in the same manner as in the third variant example of the first embodiment.

Accordingly, this embodiment is constructed so that the fuel cell temperature is adjusted using CCV control until the CCV is completely open. Then, once the CCV has been completely opened, the fuel cell temperature is adjusted using FC output limitation. As a result, it is possible to adjust the temperature of the fuel cell over a wide range, so that the maximum temperature inside the fuel cell can be reliably maintained below the acceptable upper temperature limit.

Furthermore, because CCV control is carried out primarily, and the FC output limitation is carried out secondarily, it is possible to minimize the decrease in the FC output.

(Fourth Embodiment)

Figure 21:
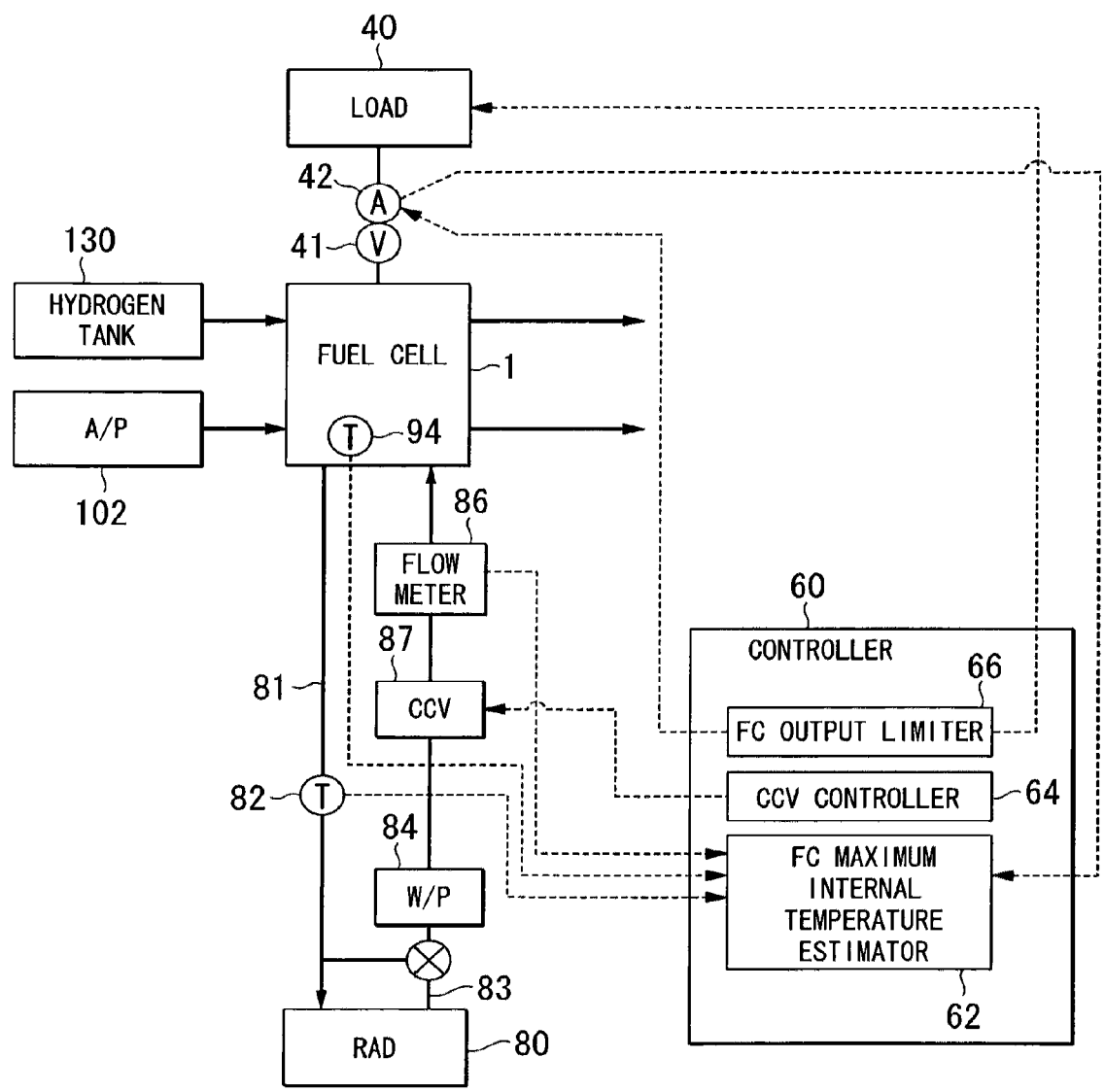
FIG. 21 is a feature block diagram of the fuel cell system according to a fourth embodiment of the present invention.

FIG. 21 is a feature block diagram of the fuel cell system according to the fourth embodiment of the present invention. The second embodiment shown in FIG. 17 is provided with an anode off-gas temperature sensor 91 and a cathode off-gas temperature sensor 92. However, in the embodiment shown in FIG. 21, a fuel cell temperature sensor 94 for measuring the fuel cell maximum internal temperature is provided in place of the aforementioned sensors 91 and 92. Note that a detailed explanation will be omitted of compositional parts that are equivalent to those of the preceding embodiments.

This embodiment is provided with a fuel cell temperature sensor 94 for measuring the maximum temperature inside the fuel cell. The area within the fuel cell that will reach a maximum temperature can be roughly predicted during the fuel cell design phase. Therefore, a fuel cell temperature sensor 94 is attached to the position that will reach the maximum temperature within the surface of the membrane electrode assembly provided to the unit cell that will reach the maximum temperature in the fuel cell. Further, in the present embodiment, the fuel cell maximum internal temperature is input from the fuel cell temperature sensor 94 to the FC maximum internal temperature estimator 62 of the controller 60.

Figure 22:
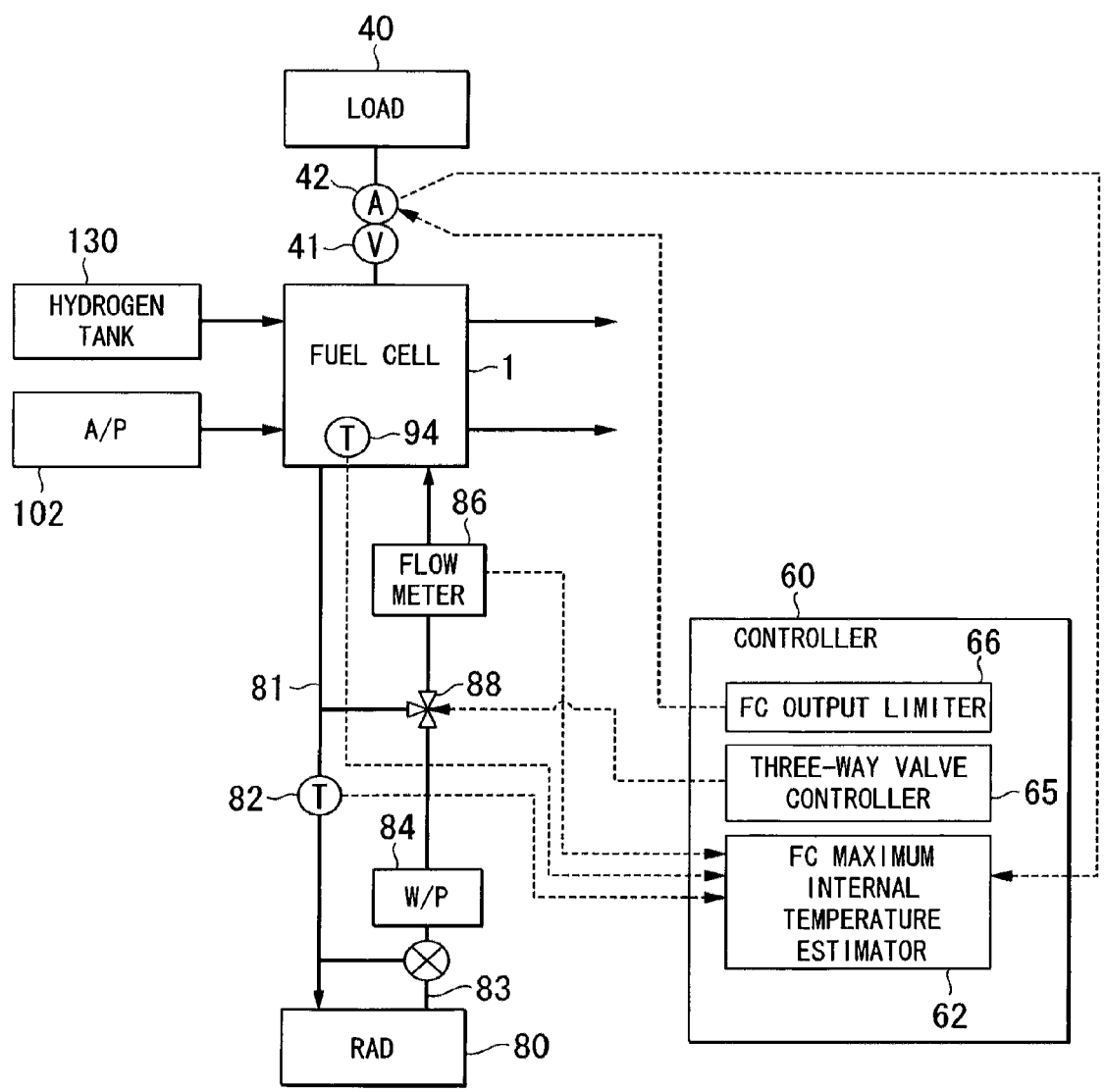
FIG. 22 is a feature block diagram of the fuel cell system according to a variant example of the same embodiment.

FIG. 22 is a feature block diagram of the fuel cell system according to a variant example of this embodiment. A three-way valve 88 and a three-way valve controller 65 are provided in the variant example shown in FIG. 22, in place of the CCV 87 and CCV controller 64 of the embodiment shown in FIG. 21. These specific structures are the same as in the second variant example of the first embodiment. Note that an anode off-gas temperature sensor 91 and a cathode off-gas temperature sensor 92 are provided in the variant example of the second embodiment shown in FIG. 18. In the variant example shown in FIG. 22, however, a fuel cell temperature sensor 94 is provided in place of these sensors 91 and 92.

The fuel cell cooling method according to this embodiment can be carried out based on the flow chart in FIG. 5, 14 or 20. When adjusting the temperature of the fuel cell using CCV control, the adjustment is carried out based on the flow chart shown in FIG. 5. When adjusting the temperature of the fuel cell using FC output limitation, the adjustment is carried out based on the flow chart shown in FIG. 14. When carrying out CCV control primarily and FC output limitation secondarily, the adjustment is carried out based on the flow chart shown in FIG. 20.

Since a fuel cell temperature sensor 94 for measuring the maximum temperature inside the fuel cell is provided in this fourth embodiment, estimation of the FC maximum internal temperature (S20) is not necessary. CCV control (S30) and FC output limitation (S40) are carried out based on the measured FC maximum internal temperature.

By providing a fuel cell temperature sensor 94 for measuring the maximum temperature inside the fuel cell in this fourth embodiment in this manner, it is possible to measure the maximum temperature inside the fuel with extreme accuracy. Accordingly, the maximum temperature inside the fuel cell can be reliably held below the acceptable upper temperature limit, and thereby enable to prevent a deterioration in the membrane electrode assembly.

(Fifth Embodiment)

Next, a fifth embodiment of the present invention will be explained. In the fuel cell system according to the above embodiment, CCV control is carried out based on the maximum temperature inside the fuel cell. The point of difference between the fuel cell system according to the present embodiment is that CCV control is carried out based on the FC output. Note that a detailed explanation will be omitted of compositional parts that are equivalent to those of the preceding embodiments.

FIG. 23A is a flow chart for the fuel cell cooling method according to the present embodiment. In this embodiment, the ignition switch is turned ON (S10), and the CCV control is immediately initiated (S30). CCV control as performed in this embodiment will now be explained.

FIG. 23B is a flow chart of the subroutine for CCV control. In this fifth embodiment, the CCV open/close interval (duty ratio) is determined using the FC output.

FIG. 23C is a map for determining the CCV open/close interval, and shows the CCV open/close duration with respect to the FC output. When the FC output is lower (lower load), there is little need to cool the fuel cell. Therefore, the CCV open duration is shortened and the CCV closed duration is lengthened. On the other hand, when the FC output is higher (higher load), there is a great need to cool the fuel cell. Therefore, the CCV open duration is lengthened and the CCV closed duration is shortened.

Figure 24:
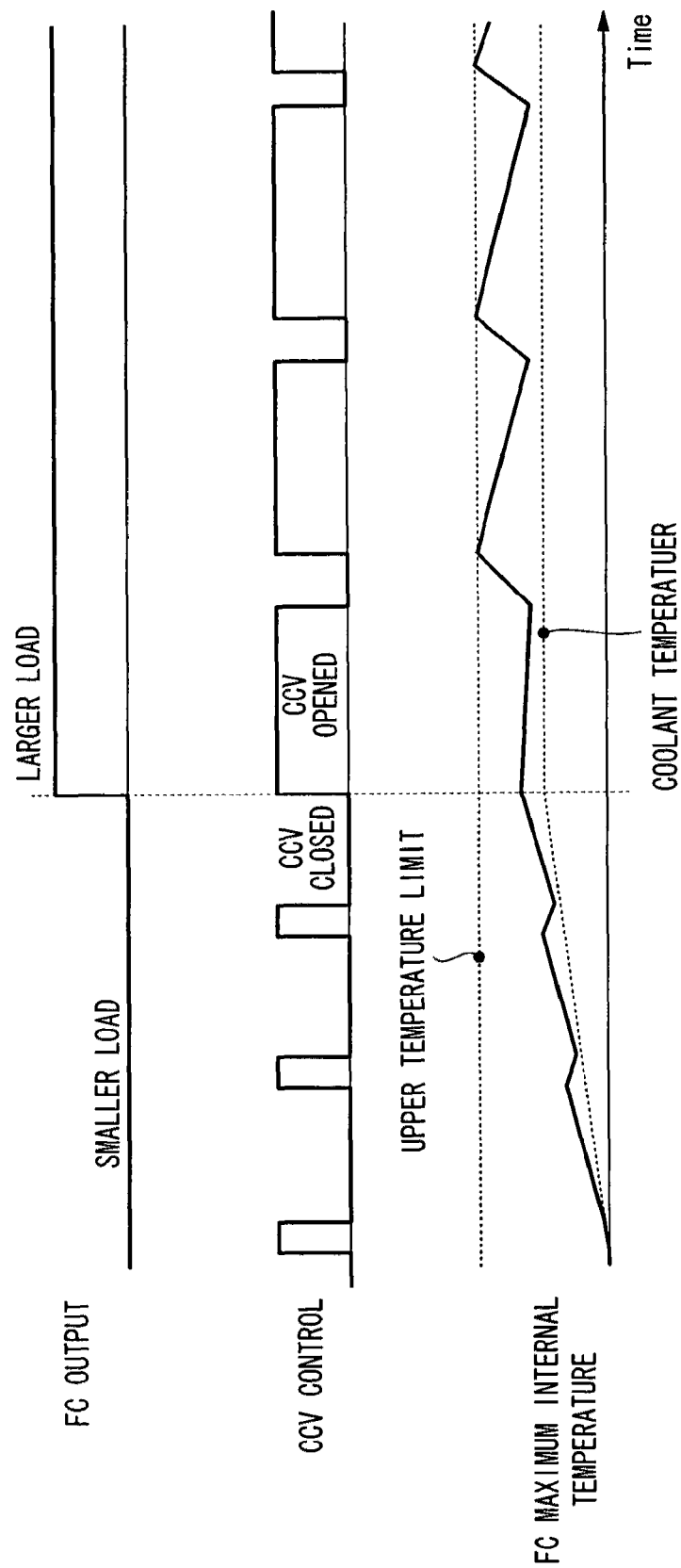
FIG. 24 is a timing chart for the cooling method for the fuel cell according to the embodiment.

FIG. 24 is a timing chart for the fuel cell cooling method according to the present embodiment. When the FC is placed in warming-up operation under low load, the CCV open duration is shortened and the CCV closed duration is lengthened. The FC maximum internal temperature falls when the CCV is open and rises when the CCV is closed, thereby promoting warm up. The FC maximum internal temperature rises when the CCV is closed and approaches the acceptable upper temperature limit. However, since the FC maximum internal temperature falls when the CCV is open, the temperature can be held below the acceptable upper temperature limit. In other words, the map for determining CCV open/closed duration interval shown in FIG. 23C is set so that the FC maximum internal temperature is maintained below the acceptable upper temperature limit.

As in the above-explained fifth embodiment, by setting the map for determining CCV open/closed duration interval in advance, it is possible to carry out CCV control based on the FC output only, and to maintain the FC maximum internal temperature below the acceptable upper temperature limit. Accordingly, it is possible to prevent deterioration in the membrane electrode assembly with such a simple structure.

(Sixth Embodiment)

Figure 26:
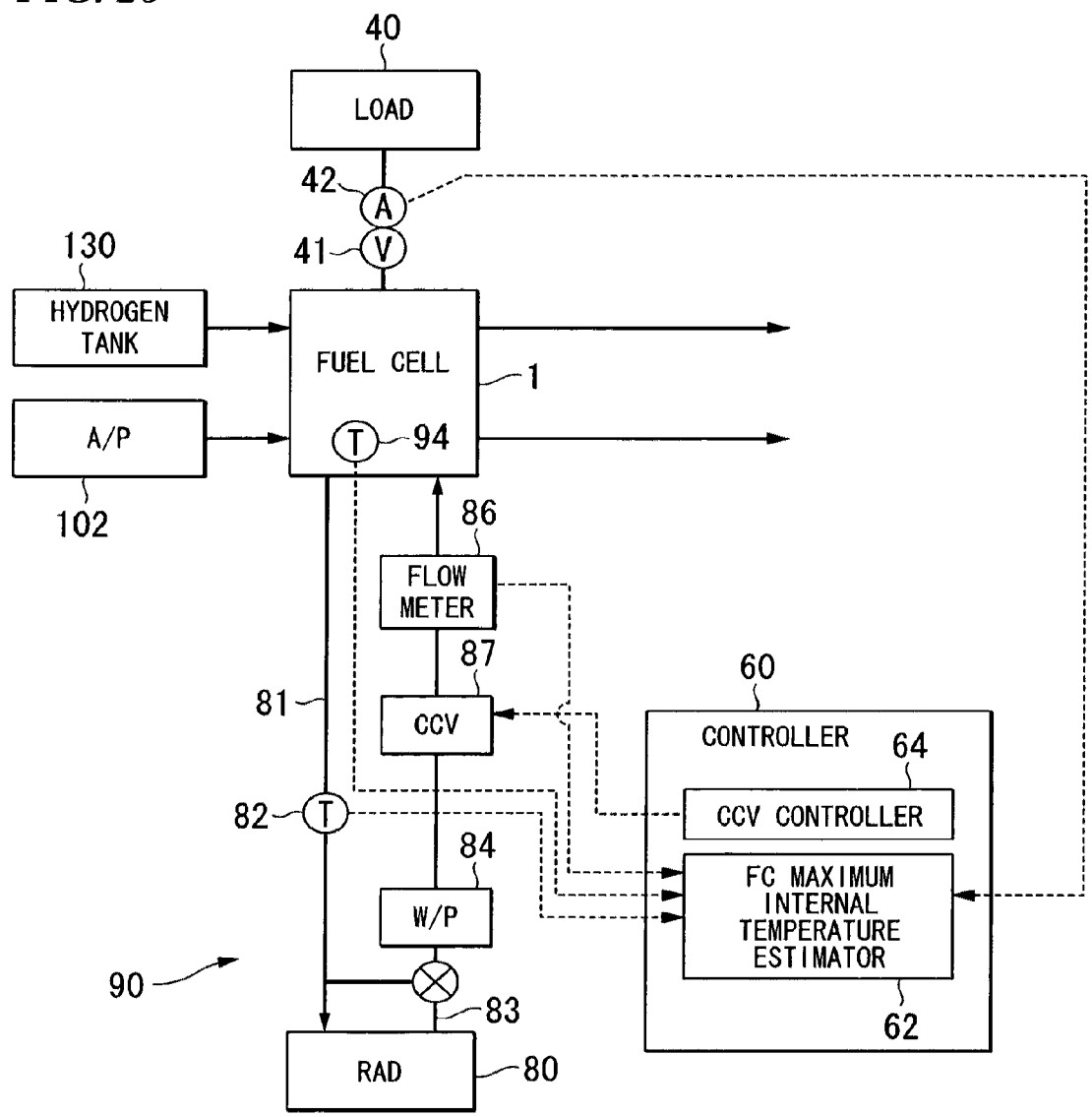
FIG. 26 is a feature block diagram of the fuel cell system according to the sixth embodiment of the present invention.

FIG. 26 is a feature block diagram of the fuel cell system according to the sixth embodiment of the present invention. The maximum temperature inside the fuel cell is estimated in the first embodiment shown in FIG. 4, however, the embodiment shown in FIG. 26 differs in that it is additionally provided with a fuel cell temperature sensor 94 for measuring the maximum temperature inside the fuel cell. Note that a detailed explanation will be omitted of compositional parts that are equivalent to those of the first embodiment.

The controller 60 in the present embodiment is provided with a FC maximum internal temperature estimator 62 for estimating the maximum temperature inside the fuel cell. As in the case of the first embodiment, this FC maximum internal temperature estimator 62 estimates the maximum temperature inside the fuel cell based on the fuel cell output and the coolant flow rate. This embodiment is further provided with a fuel cell temperature sensor 94 for measuring the maximum temperature inside the fuel cell. This fuel cell temperature sensor 94 is attached within the surface of the membrane electrode assembly of the unit cell that will reach the maximum temperature in the fuel cell 1, at the position on the surface that will reach the maximum temperature. Further, in this embodiment the fuel cell maximum internal temperature measured by the fuel cell temperature sensor 94 is input to the FC maximum internal temperature estimator 62 of the controller 60.

The fuel cell cooling method according to this embodiment can be carried out based on the flow chart in FIG. 5. However, since a fuel cell temperature sensor 94 for measuring the maximum temperature inside the fuel cell is provided in this embodiment, CCV control (S30) may be carried out based on the measured FC maximum internal temperature during normal operation. In the case where the fuel cell temperature sensor 94 has malfunctioned, CCV control (S30) may be carried out based on the estimated FC maximum internal temperature.

In this manner, even in the case where the fuel cell temperature sensor 94 which measures the fuel cell maximum internal temperature has malfunctioned, CCV control is carried out by estimating the fuel cell maximum internal temperature. As a result, it is possible to prevent the occurrence of overheating within the fuel cell. Thus, the maximum temperature inside the fuel cell can be maintained below the acceptable upper temperature limit with surety, and deterioration in the membrane electrode assembly (and particularly the electrolytic membrane) can be prevented.

Moreover, measurement of the fuel cell maximum internal temperature by the fuel cell temperature sensor 94 and estimation of the fuel cell maximum internal temperature based on parameters such as the fuel cell output and the coolant flow rate are carried out simultaneously. As a result, when the difference between the measured maximum temperature and the estimated maximum temperature and estimated values exceeds a preset value, it is possible to promptly detect a malfunction in the fuel cell temperature sensor 94 (i.e., an offset malfunction). Thus, it is possible to prevent the occurrence of overheating within the fuel cell, the maximum temperature inside the fuel cell can be maintained below the acceptable upper temperature limit with surety, and deterioration in the membrane electrode assembly can be prevented.

Note that in the sixth embodiment, an explanation is provided using as an example the case where a fuel cell temperature sensor 94 is added to the fuel cell system of the first embodiment. Similarly, however, it is also possible to construct a fuel cell system by adding a fuel cell temperature sensor 94 to another embodiment or one of the previously explained variant examples thereof.

The present invention is not limited to the preceding embodiments. For example, the shape of the reaction gas flow path or coolant flow path in the fuel cell is not limited to those described above, but may take an optional form instead.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell system comprising:
    a fuel cell which generates electrical power through the reaction of a reaction gas;
    a reaction gas supply device which supplies the reaction gas to the fuel cell;
    a cooling device which cools the fuel cell by circulating a coolant through the fuel cell;
    a fuel cell operating temperature output device which outputs a maximum temperature inside the fuel cell as an operating temperature of the fuel cell;
    a fuel cell temperature adjustment device which adjusts a temperature inside the fuel cell so that the operating temperature inside the fuel cell is less than a preset upper temperature limit;
    wherein the cooling device comprises a coolant supply device which supplies the coolant in conjunction with an operation of the reaction gas supply device;
    wherein the fuel cell temperature adjustment device comprises a coolant flow rate adjustment device which adjusts a flow rate of the coolant in accordance with the temperature inside the fuel cell independently of the coolant supply device, the coolant flow rate adjustment device being a coolant control valve;

wherein the fuel cell operating temperature output device comprises a fuel cell operating temperature estimator which obtains the maximum temperature inside the fuel cell by adding a temperature of the coolant to an estimated value for an amount of change in temperature inside the fuel cell that is estimated based on an output of the fuel cell and a coolant flow rate during warming-up operation after an ignition switch is turned on where opening of the coolant control valve is made small and the coolant flow rate is reduced, such that the lower the coolant flow rate becomes, the larger the estimated value becomes;

wherein the coolant supply device is linked to the reaction gas supply device; and wherein the coolant supply device is connected on the same axis as the reaction gas supply device so that the coolant supply device and the reaction gas supply device are driven together.

2. The fuel cell system according to claim 1, wherein:
the fuel cell temperature adjustment device is provided with a fuel cell output limiter which limits the output of the fuel cell.

3. The fuel cell system according to claim 1, wherein the temperature of the coolant is set as a lower limit of the maximum temperature inside the fuel cell.

4. The fuel cell system according to claim 1, wherein, when the maximum temperature inside the fuel cell approaches the preset upper temperature limit, opening of the coolant control valve is increased to decrease the maximum temperature inside the fuel cell.

* * * * *